United States Patent [19]

David

[11] Patent Number: 4,702,205
[45] Date of Patent: Oct. 27, 1987

[54] EXTERNAL COMBUSTION VANE ENGINE WITH CONFORMABLE VANES

[76] Inventor: Constant V. David, 4952 Field St., San Diego, Calif. 92110

[21] Appl. No.: 866,944

[22] Filed: May 27, 1986

Related U.S. Application Data

[63] Continuation-in-part of Ser. No. 789,451, Oct. 21, 1985, Pat. No. 4,653,274, which is a continuation-in-part of Ser. No. 586,812, Mar. 6, 1984, Pat. No. 4,561,252.

[51] Int. Cl.$^4$ ............................................. F02B 71/04
[52] U.S. Cl. ...................................... 123/236; 60/595; 123/237; 418/99; 418/147; 418/156; 418/268
[58] Field of Search ................... 60/595; 123/204, 236, 123/237, 243; 418/91, 92, 97, 98, 99, 268; 384/99, 109, 111

[56] References Cited

U.S. PATENT DOCUMENTS

| | | | |
|---|---|---|---|
| 236,732 | 1/1881 | Sutton | 418/268 |
| 1,877,250 | 9/1932 | Meyer | 418/268 X |
| 3,057,157 | 10/1962 | Close | 123/204 X |
| 3,339,670 | 9/1967 | McGrew et al. | 418/99 X |
| 3,502,920 | 3/1970 | Chaboseau | 384/99 X |
| 3,744,942 | 7/1973 | Mount | 418/99 X |
| 3,989,011 | 11/1976 | Takahashi | 123/204 |
| 4,018,191 | 4/1977 | Lloyd | 123/243 |

FOREIGN PATENT DOCUMENTS 1401401 10/1968 Fed. Rep. of Germany ........ 418/92
1815711  6/1970 Fed. Rep. of Germany ...... 123/204

Primary Examiner—Michael Koczo

[57] ABSTRACT

An external combustion engine including a rotary motor equipped with non-sliding vanes but conformable to the shapes of the envelopes within which they are contained and forced to operate and a combustion member comprising a sleeve in which a piston is free to reciprocate. The two end closures of the sleeve and the piston ends cooperate to form combustion chambers at both ends of the piston strokes. The motor compresses air for admission in the combustion chambers where fuel is burned and is also used for expanding the combusted gas resulting from the fuel combustion. The gas expansion produces more energy than is required to compress the air. The energy difference constitutes the energy yielded by the engine in the form of shaft power. The air admission, the combusted gas exhaust from the combustion member, the fuel injection and ignition are all timely controlled by the piston motion. The air compression and the gas expansion may be performed by a different set of vanes, but may also be performed by the same set of blades, depending upon the manner in which the motor is constructed. In one motor configuration, rigid blades are articulated to allow the blade conforming, whereas blades are flexibly constructed in another alternate motor configuration, to the same end.

15 Claims, 43 Drawing Figures

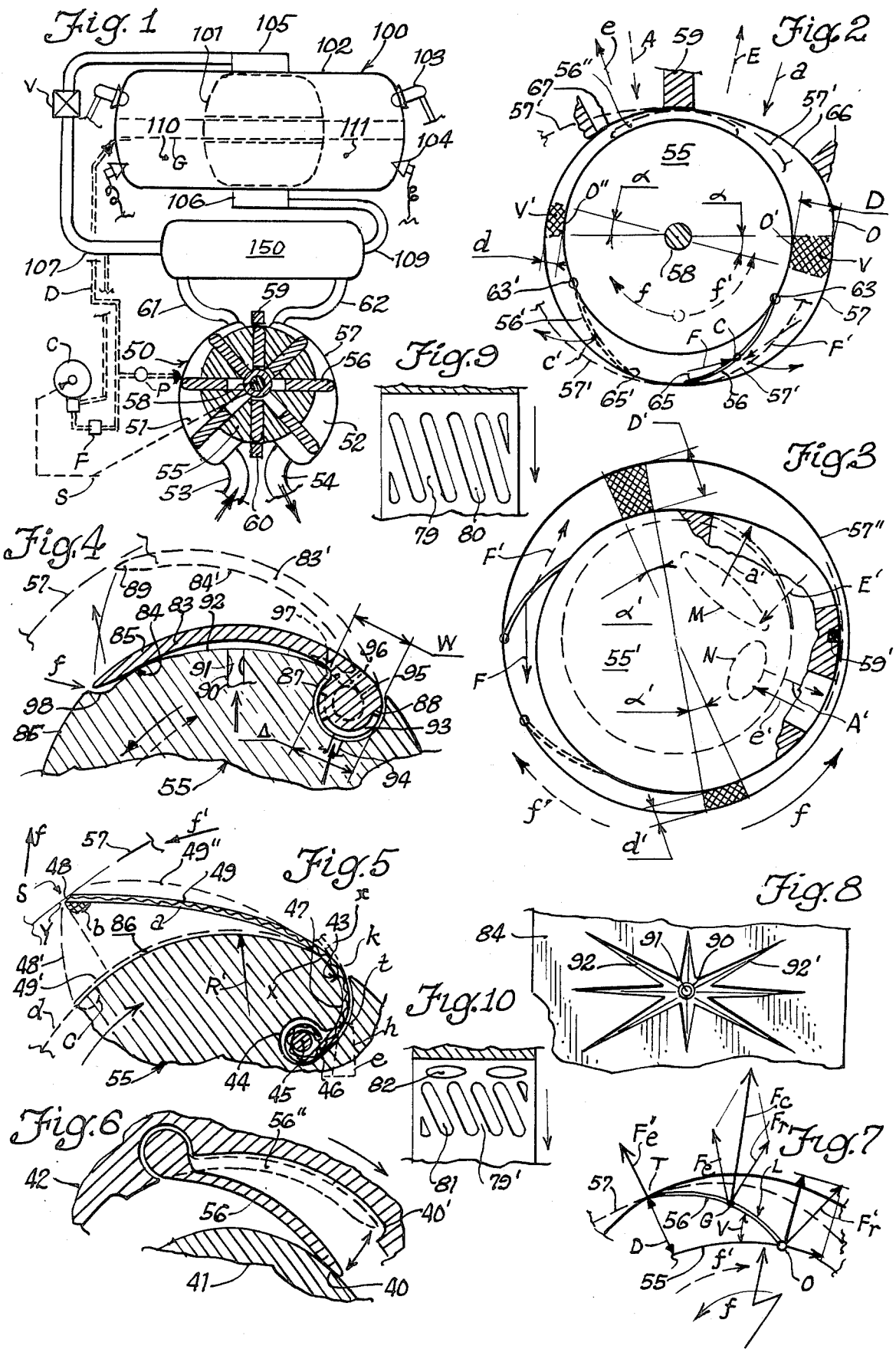

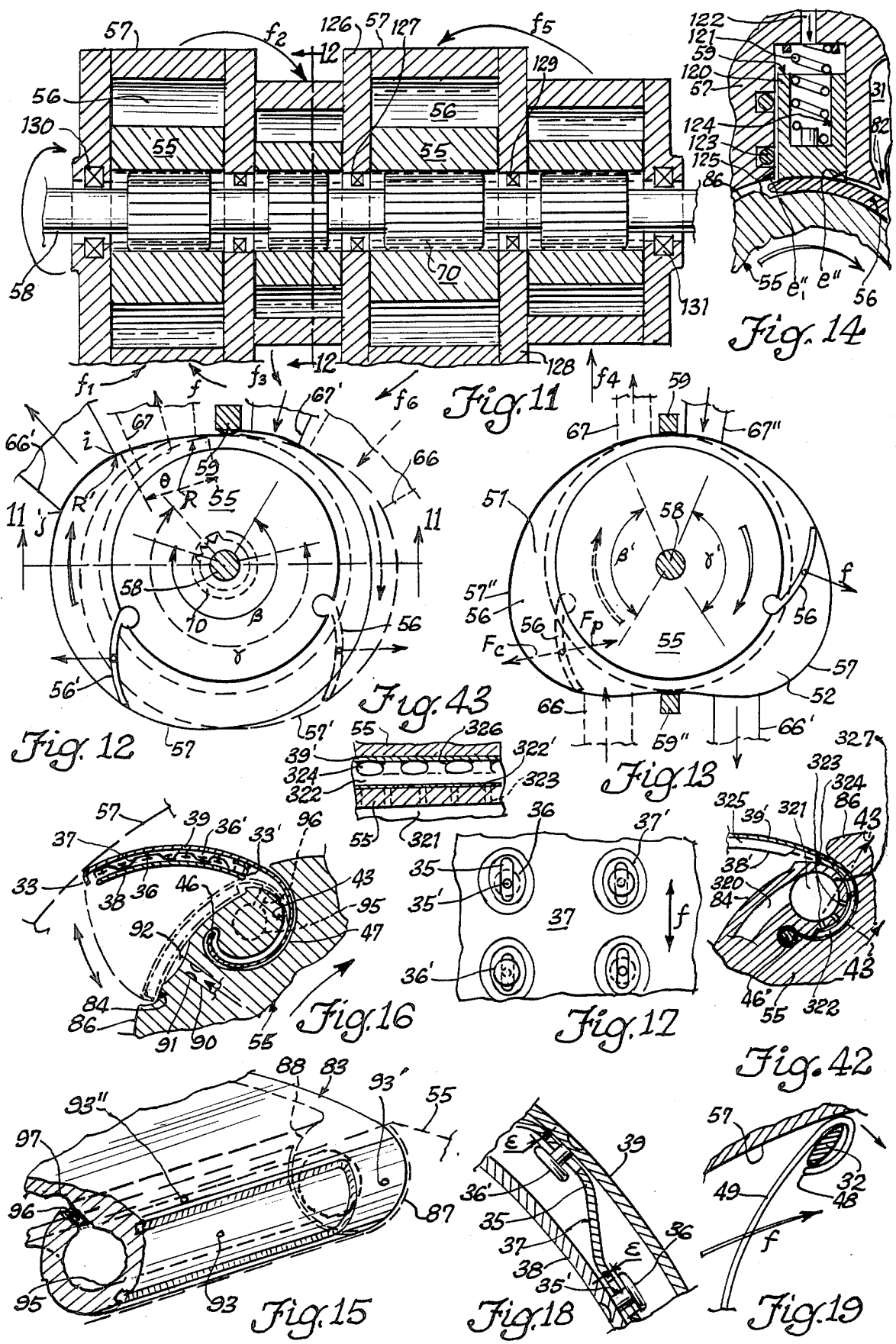

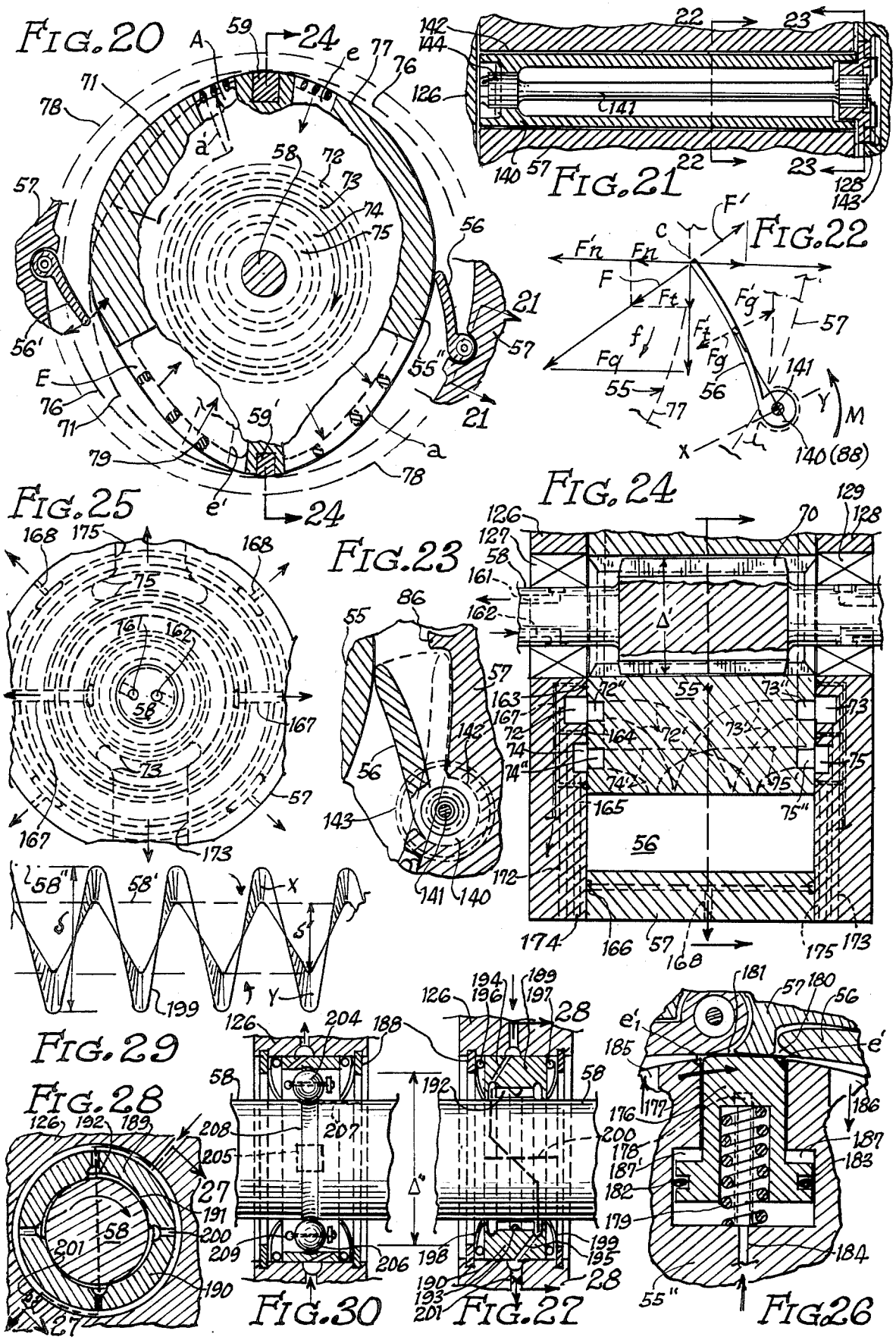

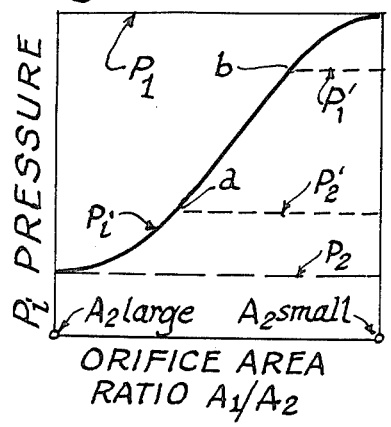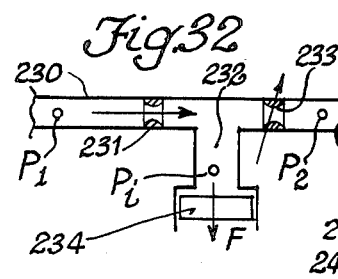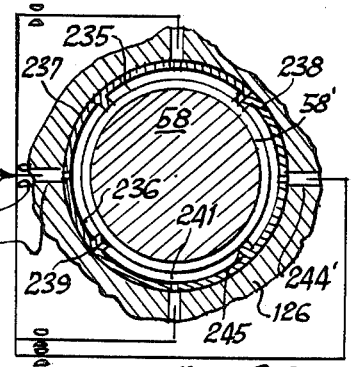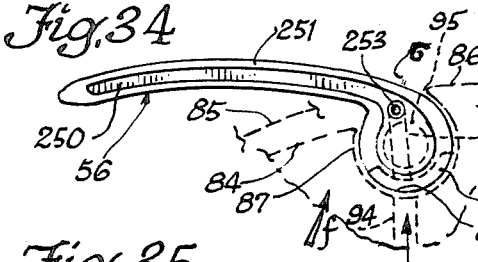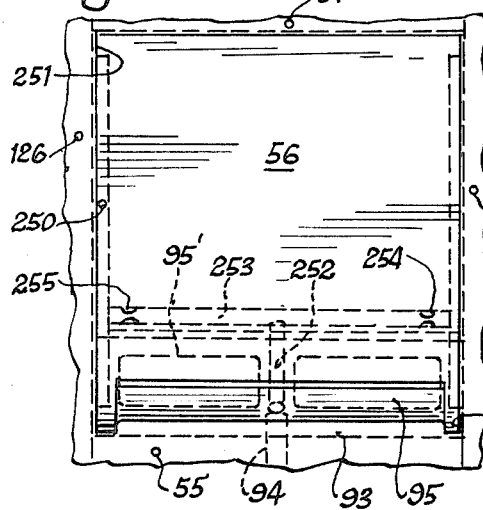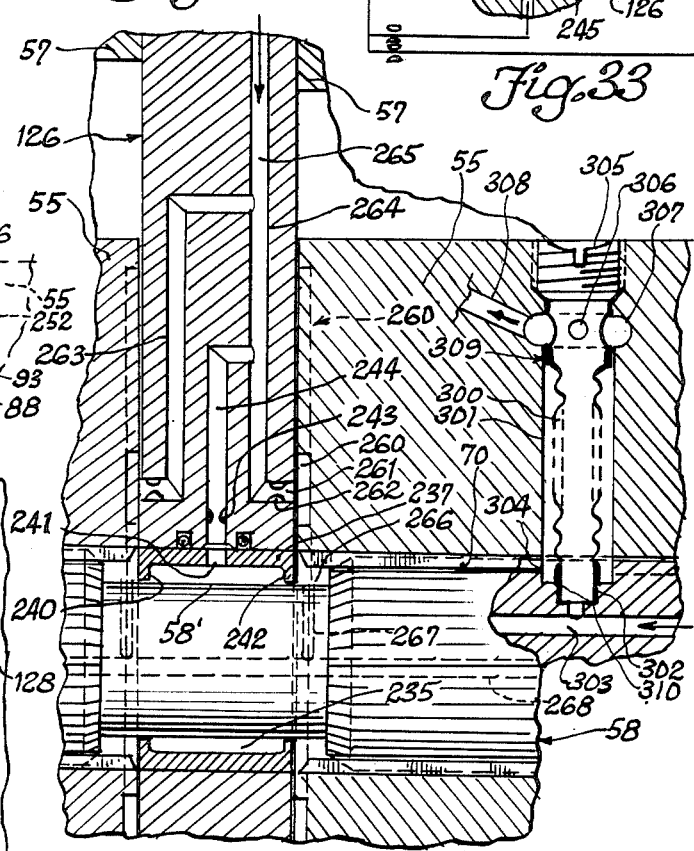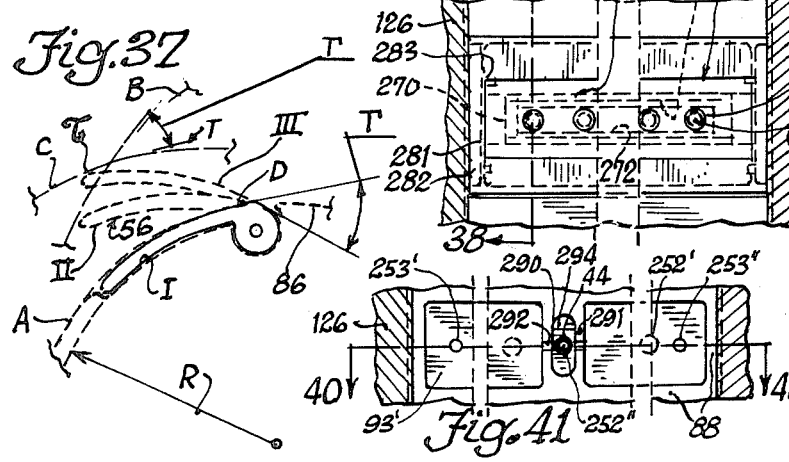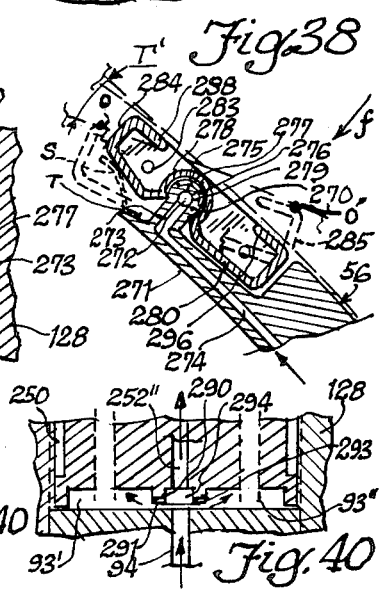

EXTERNAL COMBUSTION VANE ENGINE WITH CONFORMABLE VANES

CROSS-REFERENCE TO RELATED APPLICATIONS

This application is a continuation-in-part of my prior pending application Ser. No. 789,451 filed Oct. 21, 1985, now U.S. Pat. No. 4,653,274, which in turn was a continuation-in-part of my prior application Ser. No. 586,812 filed Mar. 6, 1984 and entitled EXTERNAL COMBUSTION ENGINE which resulted in U.S. Pat. No. 4,561,252 dated Dec. 31, 1985 and entitled FREE PISTON EXTERNAL COMBUSTION ENGINES.

BACKGROUND OF THE INVENTION

The present invention relates to an external combustion engine that combines the advantages of different types of piston and rotary engines, and even of gas turbines, into a single construction arranged in a manner such that the free piston never makes solid contact with the sleeve while operating.

Diesel and Otto Cycle engines produce undesirable vibrations and low frequency noise. Diesel engines require high compression ratios and are difficult to start. Piston engines require the transformation of linear motion into circular motion, which is costly in terms of space and weight, thus they are heavy and necessarily bulky. The Wankel rotary engine has not held its anticipated promises, its lubrication being one cause of problems. Gas turbines require high rotation speeds, are small and light, but generate high pitch noises, are inefficient and expensive to manufacture. They do not appear practical for propulsion application to automobiles. The concept of the vane engine appears promising, but the guiding of the vanes during their in-and-out sliding motion seems fraught with potential problems.

Thus efforts are needed and continuously being made to develop new and different engine concepts; engines which could be smaller, lighter, less particular in terms of fuel type and quality, long lasting, easy to start, exempt of troublesome cooling and/or lubricating problems. Being easy to operate, less expensive to manufacture and more efficient, and capable of burning a wider range of more easily available and less expensive fuels are indeed additional enviable characteristics.

In view of this background, it is an object of the present invention to provide a new and improved combustion engine which combines the most advantageous construction features of the three types of engines mentioned above embodied into an efficient power plant which will operate equally well with various types of fuel under severe conditions and during a longer lifetime.

It is another object of the present invention to provide a slower combustion process to enhance burning efficiency, thus minimizing air pollution and allowing the use of less volatile and expensive fuels, possibly of a non-fossil nature, as methanol.

It is another object of the present invention to provide an improved power plant that is of simpler construction and with fewer and simpler moving parts.

It is another object of the present invention to provide a new and improved type of engine that produces lower noise and vibration levels for comparable power.

It is another object of the present invention to provide a new and improved power plant that is characterized by design flexibility for accomplishing optimizing objectives such as space and weight saving for easy adaptation to a specific application.

It is another object of the present invention to provide a new and improved engine in which friction losses are minimized, thereby easing lubrication and cooling requirements.

It is another object of the present invention to provide a new and improved power plant in which a heat exchanger combined with a storage tank for compressed air and combusted gases may easily be installed between the combustion member and the power producing member.

It is another object of the present invention to provide a new and improved engine in which the mechanical segregation of the combustion member and of the power delivering member permits an optimum use of construction materials of a nature best suited for the specific component operation.

It is another object of the present invention to provide a new and improved power plant with enhanced overall reliability and in which maintenance and repair work is rendered easier and less complex and expensive.

It is another object of the present invention to provide a new and improved engine wherein the vibrations transmitted onto the engine mountings and the power shaft have lower levels and are of higher frequencies than is usually the case for conventional piston engines.

Finally it is still another object of the present invention to provide a new and improved vane engine in which the reciprocating motion of the vanes in the motor is eliminated and replaced by guided conforming vane displacements that cause less friction and provide more effective sealing.

SUMMARY OF THE INVENTION

The above objects are retained by an external combustion engine utilizing an engine member including air compression means in communication with separate external combustion means. The resulting combustion gases pass from the combustion means into combusted gas expansion means which provides power for driving the compression means and useful shaft power.

Accordingly, the present invention provides a vane engine in which the four principal functions: air compression, fuel combustion, heat exchange and gas expansion; are physically segregated. The combustion process is temporally independent from the operations of air compression and gas expansion. The power drive and the combustion member are not mechanically connected. Thus, the operating regimes of the combustion process and of power production are fully independent. The combustion has more time to proceed and is therefore more complete. No side loads are applied to the combustion member mobile parts which are free to move frictionlessly. The vanes extending between the motor stationary member and rotating member may swing back and forth as required to accommodate the relative motion of these two members. Only one free edge of each vane is compelled to slide on a moving surface, thereby minimizing friction while providing sealing.

DESCRIPTION OF THE DRAWINGS

FIG. 1 is a diagrammatic view of the free piston engine showing its three main members and their interconnection.

FIG. 2 is a schematic sectional view of the engine member showing typical vane mounting arrangements with a rotating central body.

FIG. 3 is a schematic sectional view of the engine member showing typical vane mounting arrangements with a rotating outer structure.

FIG. 4 is a partial transversal sectional view of a rigid vane shown articulated on the rotating central body.

FIG. 5 is a partial transversal sectional view of a flexible vane shown mounted on the rotating central body.

FIG. 6 is a partial transversal sectional view of a rigid vane shown mounted on the rotating outer structure.

FIG. 7 is a diagram showing the forces acting on a typical vane shown mounted on a rotating central body.

FIG. 8 is a planar view of the groove construction located underneath a folded vane.

FIG. 9 is a planar view of typical openings for air admission and exhaust, and gas exhaust, on which the vane free edge slides as the vane passes by.

FIG. 10 is a planar view of the openings for the admission of combusted gas into the expansion chamber.

FIG. 11 is a midsectional elevation view of a typical schematic assembly of the central bodies and of the external structures of a two-stage engine arrangement in which the air compression and the gas expansion are performed by separate central-body/external-structure assemblies.

FIG. 12 is a diagrammatic transversal sectional view of a single stage arrangement corresponding to FIG. 11 configuration with a stationary circular central body.

FIG. 13 is a diagrammatic transversal sectional view of a single stage engine arrangement in which the air compression and the gas expansion are alternatively performed by the same vanes.

FIG. 14 is a transversal sectional view of a sealing construction located between a central rotating body and an external stationary structure.

FIG. 15 is a partial perspective sectional view of a rigid vane articulation air cushion.

FIG. 16 is a schematic transversal sectional view of a rigid vane having a flexible attachment.

FIG. 17 is a partial planar view of the stiffening member of the vane shown in FIG. 16.

FIG. 18 is an enlarged partial transversal sectional view of the stiffening construction arrangement of FIG. 16 vane.

FIG. 19 is a schematic sectional view of the free edge of a flexible vane showing an edge-stiffening construction.

FIG. 20 is a schematic transversal sectional view of a single stage engine arrangement having vanes mounted on a circular external structure and cooperating with a non-circular rotating central body.

FIG. 21 is a partial sectional view of a rigid vane articulation equipped with a torsion spring.

FIG. 22 is a schematic sectional view of a rigid vane taken along section line 22—22 of FIG. 21 and showing diagrammatically the forces exerted on the vane.

FIG. 23 is a transversal sectional view of a rigid vane taken along section line 23—23 of FIG. 21.

FIG. 24 is a partial midsectional elevation view of one stage of the engine construction shown in FIG. 20 and taken along section line 24—24 of FIG. 20.

FIG. 25 is a partial side view of the engine construction shown in FIG. 24 showing air and gas ducting and collecting.

FIG. 26 is a transversal sectional view of the seal construction used in the engine construction shown in FIG. 20.

FIG. 27 is a partial midsectional elevation view of an oil wedge slip bearing shown in the engine construction of FIG. 24.

FIG. 28 is a transversal sectional view of FIG. 27 bearing taken along section line 28—28 of FIG. 27.

FIG. 29 is a view of a sealing element used with the seal construction of FIG. 27 and shown stretched out along its axis of symmetry.

FIG. 30 is a partial midsectional elevation view of a ball bearing construction for use in the engine construction shown in FIG. 24, as an alternate bearing design.

FIG. 31 is a graph indicating how the air pressure varies between two restricting orifices mounted in series.

FIG. 32 is a diagram showing two typical restricting orifices mounted in series in an air duct.

FIG. 33 is a schematic of a typical air cushion bearing illustrating the arrangement of restricting orifices in air ducts.

FIG. 34 is an end view of a typical rigid vane shown equipped with centering side air cushions.

FIG. 35 is a developed plan view of the rigid vane of FIG. 34 as seen along the direction of arrow f.

FIG. 36 is a partial midsectional elevation view of an assembly of flange, air bearing, shaft and associated rotors showing the arrangement of air ducting and restricting orifices.

FIG. 37 is a schematic diagram showing the angular displacements of a rigid vane between its two extreme positions.

FIG. 38 is a transversal sectional view of an air cushion pad mounted at the tip of a rigid vane taken along section line 38—38 of FIG. 39.

FIG. 39 is a partial plan view of the air cushion pad of FIG. 38 shown as seen along the direction of arrow f.

FIG. 40 is a partial longitudinal sectional view of a rigid vane articulation constructed to channel high pressure air through the articulation.

FIG. 41 is a partial developed plan view of the articulation of the rigid vane shown in FIG. 40.

FIG. 42 is a partial cross-section of the articulation of a partially flexible and partially rigid (semi-rigid) vane shown mounted on a rotor, presenting the high pressure air channelling from the central body into the vane structure.

FIG. 43 is a partial sectional view taken along section line 43—43 of FIG. 42 of the connection of small flat high pressure air ducts which join the air collection box to the rigid part of a semi-rigid vane.

DETAILED DESCRIPTION OF THE INVENTION

Referring to FIG. 1 of the drawings, the external combustion engine shown in a schematic form comprises a sliding vane motor 50, a combustion member 100 and a storage tank 150 also acting as heat exchanger. Motor 50 compresses air in compression chamber 51 and combusted gas expand in expansion chamber 52. Atmospheric air is introduced through admission duct 53 and the expanded combusted gas exits to the atmosphere through exhaust duct 54. A central body or rotor 55 guiding a plurality of vanes 56 extending to an external structure 57 receives power from the expanding gas and supplies power for the air compression. The excess of power received over power supplied is transmitted to a power shaft 58. Two seals 59 and 60 insure that no leakage takes place between the compression chamber and the expansion chamber. Duct 61 channels compressed air to storage tank 150 and duct 62 feeds combusted gas out of storage tank 150 into expansion chamber 52, while heat exchange takes place in the storage tank.

The combustion member comprises a free piston 101 reciprocating inside a sleeve 102 having end closures onto which fuel injectors 103 and spark plugs 104 are mounted. Compressed air from storage tank 150 is ducted to air valving connection 105 through pipe 107. Combusted gas from the combustion member is ducted to the storage tank from the gas valving connection 106 by pipe 109. Channels in piston 101 (not shown here, but fully described in my U.S. Pat. No. 4,561,252) connect the two valving connections to combustion chambers 110 and 111 formed by and when the free piston reaches the end of either of its two strokes.

The drawings of FIGS. 2 to 24 represent varied constructions of motor 50 in which vanes 56 do not slide in central body 55 but are constructed to swing back and forth between the outer surface of rotor 55 and the inner surface of external structure 57. FIGS. 2, 3, 12, 13 and 20 depict various combinations of shapes of, rotations of and vane attachments to either the central body or the external structure. FIGS. 4, 5, 6, 15, 16, 17, 18 and 19 illustrate various vane constructions and attachments. These variations of designs and constructions may be combined as seems most advantageous and the descriptions herebelow are given only as examples of possible embodiment constructions.

FIG. 2 schematic drawing represents an engine construction in which rotor 55 is circular and rotates inside structure 57. Two vanes, 56 in solid line and 56' in dash line, are shown to illustrate the two manners in which a vane may be connected to the rotor by means of articulation 63 or 63', free edge 65 or 65' being force to slide on structure 57 inner surface because of the vane swinging outwardly in the direction of the arrows. During one rotor revolution, vane 56 moves from a fully folded position shown by vane 56'' to a fully extended position when vane 56 free end reaches point O. At this point, the distance between the rotor outer surface and structure 57 inner surface is shown as approximately D. As point O' reaches point O'' (one rotor half turn in the direction of arrow f), that distance is smaller (d) because of the shape of structure 57 inner surface. Cross-hatched area V' is thus smaller than area V (for the same incremental angular variation $\alpha$ of the rotor motion). If all air trapped between contiguous vanes is forced to follow the central body rotation, that air becomes compressed by the ratio V/V'. Vice-versa, if the rotation direction is reversed as shown by arrow f', area V' augments and the trapped gas expands by a ratio V/V'. A rotation reversal thus changes compression into expansion. Because both the compression and the expansion operations must of necessity be performed by rotating bodies revolving in the same direction and be mounted on the same shaft, the compression means and the expansion means need only be symmetrical with respect to an imaginary vertical plane orthogonal to FIG. 2 plane and passing through shaft 58 centerline. Doing so makes vane 56 become 56', and line 57 become 57' as partially shown, which is not altogether advisable. The dynamics of the vane must now be described.

Assuming that the center of pressure and the vane center of gravity (CG) is at point C (or C'), neglecting the vane weight at this point, air compression generates a force F, whereas gas expansion generates a force F'. Force F pushes the vane outwardly and force F' pushes the vane inwardly, because the corresponding pressure differentials across the vane are reversed. Unless the centrifugal force exerted on the vane is always larger than the pressure differential force, the free edge of the vane cannot always perform its sealing role. Such a condition would most certainly develop at low speeds and such an arrangement is thus unacceptable. However, when the vanes are mounted identically on the central body for both compression and expansion, it becomes obvious that both compression and expansion will exert outwardly directed forces on all vanes, continuously. Vanes 56, as depicted, then function equally well for air compression and gas expansion.

Assuming that compression corresponds to the schematic shown in solid lines and that expansion corresponds to the schematic shown in dash lines, the air admission is shown by arrow a and opening 66, the compressed air exhaust is shown by arrow e and opening 67, the combusted gas admission is shown by arrow A and opening 67, and the combusted gas exhaust is then shown by arrow E and opening 66. The compression and the expansion take place in different planes separated by a flange (not shown here, but in FIG. 11 for instance). Because compression and expansion become thus disconnected, except through shaft 58, the expansion ratio per rotor revolution (or approximately 300°-angle) may be made larger than the compression ratio (contour 57' "bulges out" more than contour 57). The significance of this point is discussed at length in the next section. The separation distance between seal 59 and the outer surface of rotor 55 corresponds to the thickness of the vane, although seal 59 is spring loaded and constantly pushed inwardly to insure positive sealing.

The schematic drawing of FIG. 3 presents another combination of parametric conceptual design variations in which central body 55' is fixed or stationary and external structure 57'' rotates, thus becoming the rotor. The similarities between FIG. 2 and FIG. 3 schematic drawings are obvious and the reference numbers are the same, but given a ' index, for easy recognition. Air and gas are admitted through openings located on the outer fixed surface of the central body. Their collecting and channelling to a stationary component are performed by means of slip collectors such as M and N shown in phantom lines and in more detail in FIGS. 24 and 25, and described further on. The symmetrical positioning of the air compression and gas expansion means also applies here, as earlier discussed. In this engine construction, the centrifugal forces exerted on the vanes tend to swing them outwardly, which is undesirable. Because the rotary body must of necessity be of revolution here and the vanes should preferably be all the same, the vanes must be connected to and supported by the structure that provides this circular track surface. This engine construction requires the use of means for overcoming the effect of the centrifugal forces. A spring loading system constructed to exert the needed counteracting torque on the vanes is shown in FIGS. 21-23 and is described later on.

The schematic drawing of FIG. 12 depicts the result of superposing the compression and the expansion modules described in FIG. 2. The compression module is shown in phantom lines and the expansion module is illustrated in solid lines. The expansion takes place over the angular displacement β and the compression takes place over angular displacement γ of any reference point located on the rotating central body. Central bodies 55 are connected to common shaft 58 by means of spline arrangements 70. In the schematic drawing of FIG. 13, the air compression and the gas expansion modules are located in the same plane, half a revolution being allocated to one function and the other half of the revolution to the other function; the respective angular displacements of the rotor for each function being thus half of β and γ. This engine construction now bears more resemblance to engine 50 of FIG. 1. Two seals, 59 and 59'', are needed. Vanes 56 operate on both sides: air compression and gas expansion. The vanes are thus pushed outwardly by the gas pressure differential when on the expansion side and pushed inwardly by the air pressure differential when on the compression side.

In FIG. 13, vanes 56 are attached to the rotor in a manner such that the gas expansion swings them outwardly. Again, expansion chamber 52 may be larger than compression chamber 51 for increasing the engine thermodynamic efficiency. Some type os torque must be exerted onto the vanes, which naturally applies whether vane 56 operates in the compression chamber or in the expansion chamber.

The schematic drawing of FIG. 20 corresponds to an engine configuration in which the central body rotates, the external fixed structure is circular and the vanes are mounted onto the stationary structure, swing inwardly and are not subjected to centrifugal forces. Although only one chamber could be formed per each rotor revolution (one rotor lobe and one seal in one plane) as shown in FIG. 2, FIG. 20 construction however corresponds to a two-lobed rotor requiring two seals. The rotor may be symmetrical with respect to a vertical plane orthogonal to the figure plane or constructed to be symmetrical with respect to the centerline of shaft 58 (phantom line 71 in FIG. 20 left side). In either case, air and gas are collected and ducted inside the rotor. In the latter case, both sides must have the same function: i.e.: air compression or gas expansion; and the vanes are subjected to pressure differentials that are always oriented in the same direction. In the former case, one side must be used for one function and the other side for the other function, so that the pressure differentials across the vane change orientation twice during each rotor revolution. The vanes must then be spring-loaded as earlier mentioned. In FIG. 20, the two vanes shown, 56 and 56', are positioned to have their free edges rest on a rotor contour which corresponds to two compression sides, in which case seals 59 and 59' are identical. In the case of the solid line engine construction, seal 59 is located between two high pressures whereas seal 59 ' is located between two low pressures and has a less vital role to play, thus may be different from seal 59.

The openings corresponding to a, e, A, E, a' and e' shown in FIG. 20 for the air and gas transfer in an out of the work chambers (expansion and/or compression) have been mentioned earlier. The air and gas ducting inside the rotor is depicted in FIGS. 24 and 25 and explained hereinunder. Circular grooves located on the sides of rotor 55 collect the air and the gas to and from these openings. Four such concentrically located grooves are shown: 72, 73, 74 and 75; for illustrative purpose only.

Phantom line 76 represents the locus of the contact points between the seals and the exposed faces of the folded (or retracted) vanes which then form a cylindrical surface. Phantom line 78 represents the cylindrical surface onto which the vanes are supported when folded. Solid line 77 represents the double-lobed contoured surface onto which the free edges of vanes 56 ride. The passage openings for air and gas cut in this surface are especially shaped and equipped with vane-supporting bars such as 79 so as to form a grill-like structure. A planar view of the developed portions of structural surface 77 which houses these openings is illustrated in FIG. 9 for the air admission (or gas exhaust) and air exhaust openings and in FIG. 10 for the gas admission opening. Bars 79 and 79', and opening slots 80 and 81 are oriented at an angle in a way such that the vane free edges are uniformly and continuously supported as the vanes pass by the openings. Openings for the gas admission are different and incorporate slots 82 positioned perpendicularly to the direction followed by the vane free edges. Their purpose is discussed further on, as it pertains to the vane operation.

The arrangement, design and construction of the vanes are of great importance for the present invention. Three basic types of vanes and two types of attachments will now be described. FIG. 4 drawing presents a transversal section of a rigid vane 83 installed in rotor 55 for fitting into a recess 84 cut in rotor 55 structure in a manner such that, when folded, vane 83 exposed surface 85 forms a quasi continuous cylindrical surface in cooperation with outer constantly exposed surface elements 86 of rotor 55 outer surface. A lodging 87 partially bored in rotor 55 along a generatrix the full length of the rotor houses a partly cylindrical axle 88 which extends the length of the rotor. The width W of lodging 87 opening is smaller than the diameter Δ of axle 88 so that the vane is retained by the articulation thus formed at all times. The vane may only be installed by sliding it sideways in position in the rotor.

The configuration and relative dimensions of the components of the articulation are established to allow the maximum amount of free swinging displacement that the vanes may encounter. Inner surface 57 of the external structure onto which the tip or free end 89 of the vane rides (or rests) determines and limits such swinging displacements. The lodging diameter is only slightly larger than the the axle diameter so that the vane is neither too tightly constrained nor too loose. Several construction features need be described in detail as they are essential for insuring a continuously satisfactory vane operation. The vane might stick or jam in the folded position, especially after the engine has been turned off for long perids of time and the rotational speed imparted to the rotor during starting is not sufficient to develop large enough centrifugal forces on the vanes. The two potential sources or causes of such accidents are the inner surface 84' of the vane adhering to the bottom of recess 84 and/or dirt gumming up the clearance between axle 88 and the wall of its lodging 87. The potential sticking problem may be resolved by admitting high pressure air under the folded vane by means of duct 90 venting into space 92 between surface 84' and the bottom of recess 84. A restricting orifice 91 insures that the bleed air flow so provided remains small once the vane starts swinging. A planar developed view of the star-shaped space 92 is shown in FIG. 8 to indicate how small this space volume is, yet covering a large section of the area of recess 84 bottom surface. Grooves 92' cut in rotor 55 structure constitute space 92.

Then a pressurized undercut space 93 is located on the cylindrical portion of axle 88 structure. It never vents to the chambers for any operating position of the vane, the high pressure air fed into space 93 through duct 94 can escape only through the clearance provided between the axle and the wall of its lodging. A perspective enlarged partial view of this construction is illustrated in FIG. 15. The vanes are thus articulated on the equivalent of an air cushion which also facilitates the evacuation of any possible specks of dirt which may find their way into the articulation. Lastly, an air spring action may be built into the articulation by providing a closed storage space 95 inside axle 88 vented to space 92 by holes 96 which communicate with grooves 97 cut into the underside of vane 83. At the end of a compression phase, the high pressure air fills space 95 and is stored for the instant that it takes that vane to pass over seal 59. Pressurized air is then made immediately available for helping that vane to start swinging outwardly, once passed the seal.

Finally, the opening up of a vane after passing by seal 59 may be facilitated when the vane tip 89 clears the seal and gas needs then be admitted immediately underneath the vane so as to insure certain contact between tip 89 and surface 57. To that effect, the vane tips and the edges of recesses 84 are shaped so that a gas jet directed along arrow f tends to lift up the vane tips. Such a jet is formed by the high pressure combusted gas coming from the storage tank and passing through slots 82, which are first to become open, after the vane tip has cleared seal 59. A short jet burst of gases is thus created which, combined with the other two pressurized air loads previously mentioned, helps lift the vane off its folded position.

Another approach is to make the vane flexible and springy so that it may conform to any relative positions of surfaces 86 and 57 and naturally tend to reach its fully extended position. Such a vane construction is presented in FIG. 5 where a spring band or foil 49 has its free edge 48 resting onto surface 57. The opposite edge fits through a shaped slot 47 formed in rotor 55. The foil part near edge 46 is wrapped around a core 45 in a manner such that the rolled bead thus formed may be anchored in hole 44 which extends the full length of rotor 55. Slot 47 is contoured as shown so that the foil may easily and progressively wrapped itself around curve 43. When the vane passes by seal 59, vane 49 assumes the shape shown by phantom line 49'. During its extension travel, from fully folded to fully extended, tip 48 of vane 49 follows line 48'. The vane must be flexible enough to fold without causing any permanent deformation of its material and rigid enough to prevent excessive bulging such as shown by line 49" on account of the differential pressure loads being applied on the vane. This aspect is discussed in the next section.

The drawing of FIG. 6 corresponds to a rigid vane 56 mounted onto an external structure 42 rotating around stationary central body 41. The tip 40 of the vane rides on the outer surface of central body 41 and fits in recess 40' when the vane folds to occupy position 56". The construction improvements described earlier regarding the construction details shown in FIG. 4 are also equally applicable to the construction illustrated in FIG. 6, but are not shown here for the sake of simplification.

The drawings of FIGS. 16, 17 and 18 pertain to a vane construction which results in a vane behaving semirigidly whilst still retaining some flexibility. The vane comprises two flexible foils 38 and 39 between which a dimpled stiffener 37 is sandwiched and loosely held by rivet heads 36 and 36' solidly attached to foils 38 and 39 respectively. Foil 38 and stiffener 37 extend only partly along the width of foil 39, along a span long enough to stiffen locally that part of the vane which extends between rotor 55 and structure 57. Recess 84, duct 90, orifice 91, space 92, space 95, duct 96, slot 47 and curve 43 are and play a role similar to those of identical features previously described for FIGS. 4 and 5, thus need no further elaboration. The unstiffened portion of foil 39 extends into rotor 55 and the end part of foil edge 46 is shaped in a manner such that it prevents the foil from pulling off rotor 55 during engine operation. The dimples 37' formed on stiffener 37 are shaped and arranged to accommodate a small amount of relative motion between foils 38 and 39 in the direction shown by double arrow f of FIG. 17 and some play in a direction perpendicular to the foil surfaces. Narrow elongated holes 35 located at the bottom of dimples 37' prevent stems 35' connecting the rivet heads to the foils from moving sideways and provide a clearance $\epsilon$ as shown in FIG. 18. Stops 33 and 33' on foil 39 may further limit the relative motion of foil 38.

The drawing of FIG. 19 indicates how the free edge of flexible vane 49 may be reinforced and stiffened up, while having a ballast weight concurrently added and providing a larger vane riding area, by means of core 32 being enclosed by the free end part of the vane and wrapping core 32 to form a bead. Core 32 is retained by curled up tip 48 and the shape of the bead may be optimized by giving core 32 an appropriate cross-section shape.

In FIG. 7, a force diagram indicates the types and directions of the forces acting on a typical vane during both compression and expansion. The phantom lines correspond to the expansion operation mode of vane 56 which is articulated at point O onto rotor 55 and rides on structure 57 at point T. The force diagram is discussed in the next section. FIG. 22 represents another force diagram which correponds to rigid vane 56 of FIG. 20 for both cases of air compression and gas expansion and in which the torque exerted by a spring is also considered. The significance of the latter diagram is also discussed in the next section.

Seal 59 plays an important role in the operation of the engine of the present invention. The drawing of FIG. 14 represents a cross-section of such a seal pushing against folded vane 56 and shown just about to leave the tip of vane 56 to start sliding on surface 86 of rotor 55. The seal assembly is located in and housed by stationary structure 57. A portion of the combusted gas manifold 31 and gas admission slot 82 are also shown. Slip seal 59 includes a sealing bar 120 pushed by a number of springs such as 121 and by high pressure air introduced by feed duct 122 and sealed off by straight seal beads such as 123 that also push bar 120 against resting surface 124. The sealing bar and the seal beads extend the length of rotor 55 from one separating flange to the other. The width of the bar is large enough to bridge the gap formed between vane 56 tip and edge 125 of the recess housing the vane in its folded or retracted position.

The schematic drawing of FIG. 11 depicts a longitudinal section of an engine comprised of four modules: two stages for compression and two correspnding stages for expansion. Each stage includes typically a rotor 55, a plurality of vanes 56, an external stationary structure 57, two intermediate flanges 126 and 128 supporting bearings such as 127 and 129 respectively, a splined section 70 of shaft 58 on which rotor 55 is mounted and the necessary ducts and openings needed for channelling the air and/or the combusted gas (not shown here but shown and described previously). Arrows indicate the air and gas flow directions: f1 represents the atmospheric air entering the first compression stage, f2 represents the partially compressed air leaving the first compression stage and entering the second compression stage, f3 represents the fully compressed air leaving the second stage to enter the storage tank, f4 represents the combusted gas entering the first stage of the expansion, f5 represents the partially expanded gas leaving the first stage and entering the second stage of the expansion, and f6 represents the fully expanded combusted gas exhausting to the atmosphere. More than two stages for either compression or expansion may be used and the numbers of stages of each function need not be identical. The section corresponds to the schematic of FIG. 12 representing an engine in which one stage of compression and/or of expansion takes place over one full revolution of shaft 58. End bearings 130 and 131 are different, mounted differently from and larger than bearings 127 and 128. They could be standard conventional ball or roller bearings, whereas the interstage bearings must be specially constructed as is fully described hereinunder.

FIGS. 21 and 23 present drawings illustrating the construction of a spring arrangement which is used to exert a torque on those vanes which must withstand pressure differential loads of opposite orientation during one rotor full revolution, as earlier mentioned. The spring is of a torsion type easy to house inside hollow axle 140 of any vane mounted in external structure 57 and corresponding to the engine construction of FIG. 20. Torsion bar 141 inside axle 140 oscillating within its lodging 142 is connected at one end by splines to the axle body, and by another set of splines at the other end to an adjusting nut 143 extending from and mounted in flange 128 for instance. One end of nut 143 fits snugly into the end of axle 140. Nut 143 is locked in position in the flange so as to resist the torsion bar torque. Torsion of the bar imposed by axle 140 develops such a torque as is adjusted by means of serrations 144 located at the left end of the torsion bar and which are accessible before flange 126 is installed. FIG. 23 indicates how the swinging motion of vane 56 affects the torque to be resisted by the torsion bar.

The schematic drawings of FIGS. 24 and 25 represent a single stage of both air compression and gas expansion located between two intermediate flanges 126 and 128, because these two figures correspond to an engine configuration shown in solid lines in FIG. 20. The internal channellings of both air and gas are depicted in dotted lines in the plane of the figure for easy representation, whereas they are actually located in different spaces inside rotor 55" and do not geometrically communicate, as is obvious from an examination of rotor 55" in FIG. 20. The air and gas channels connect the openings on the outer surface of rotor 55" to their respective collecting circularly shaped grooves 72", 73", 74" and 75" which are continuously facing their cooperative collecting arc-shaped chambers 72, 73, 74 and 75 diagrammatically shown in FIG. 24 for 73 and 75. In turn, chambers 72, 73,74 and 75 are connected to ducts 172, 173, 174 and 175. Ducts 173 and 175 are shown in FIG. 25, but 180° apart for ease of illustration. Bearings 127 and 129 may be lubricated and cooled by oil brought in through ducts such as 161 and returned through ducts such as 162.

Circular and concentrically located sealing and leak collecting grooves such as 163, 164, 165 and 166 may be used for evacuating combusted gas leaks which may then be ducted to a vacuum system (not shown) by means of channels such as 167 and 168. Such vacuum system prevents combusted gas leaks around the engine. Intermediate separating flanges such as 126 and 127 are thick enough to accommodate the ducting and channelling above described. The external connections with those ducts and channels are not shown, being state-of-the-art and well known.

The rotating central body of the engine configuration shown in FIG. 20 houses two slip seals 59 and 59'. A detail design applicable to both of them is given by the drawing of FIG. 26 in which sealing bar 176 is made to slide in slot 177. Bar 176 is guided by a plurality of stems 178 spaced along bar 176 length and located between springs such as 179. The sealing end of bar 176 pushes against structure 57 or a folded vane 56, as the case may warrant, and is wide enough to bridge either gap 180 or 181 when a vane 56 either starts making contact with the seal or leaves it. The other end of bar 176 is made wider and sealed by two bead seals 182 and 183 so that high pressure air may be applied by means of duct 184 onto this wider area of bar 176. Both the bar and the bead seals extend the full length of rotor 55". Openings 185 and 186 in the rotor for the exhaust of compressed air or the exhaust of combusted gas are partly shown. Spaces 187 and 187' are vented to one of the evacuating grooves used for disposing of the combusted gas leaks, as earlier mentioned.

The drawings of FIGS. 27–30 depict two types of bearings mounted in an intermediate separating flange such as 126 for instance. FIGS. 27 and 28 pertain to a slip-type bearing forming oil wedges when the shaft rotates. FIG. 30 pertains to a ball (or roller) bearing in which shaft 58 assumes the role of the inner race of the bearing. FIG. 29 illustrates the spring-type of foil seal used for both types of bearings for sealing the rotating contact with the surface of shaft 58. For all bearings, for enabling the bearing installation, the diameter $\Delta''$ of snap ring 188 used for locking the bearing assembly in place is larger than outer diameter $\Delta'$ of shaft 58 splines shown in FIG. 24.

The slip bearing of FIGS. 27 and 28 consists of two matching halves 189 and 190 slip fitting in and being held by a bore cut in flange 126. The inner bore formed by these two halves in place is shaped to create quasi-cylindrical pad surfaces as shown in FIG. 28 which urge the oil to form a self forming and sustaining oil wedge isolating shaft 58 from a pad surface such as 191. The oil viscosity and the relative velocity of shaft 58 surface cooperate in generating hydraulic pressure gradients which support the shaft and absorb its side loading from any radial direction. The oil is supplied between the pads under pressure by means of longitudinally oriented grooves such as 192 extending from one side of the pads to the other and having ridges such as 193 which are positioned and shaped to force the oil to enter the wedge spaces situated between the pads and shaft 58 surface. The oil is introduced on one side of the bearing and forced to leave on the other side due to the orientation of oil channels 194 and 195. The oil is prevented from leaking ouside by O-ring type seals 196 and 197 squeezed between the faces of the bearing and springy foil edge seals 198 and 199. The two halves of the pad forming the bearing meet along a diametrically oriented plane represented by lines 200 of FIGS. 27 and 28. The oil pressure is steadily maintained within the bearing on account of restricting orifice 201 which always insures a suitable upstream pressure of the oil. The dynamic local oil pressures generated in the wedges are much higher than the supply pressure of the oil and depend on the wedge thickness which is function of the side loads exerted by shaft 58. The means for relatively positioning the halves of the bearing is not shown, being well known in the art.

The slip foil edge seal (199 for instance) is shown extended along the axis of virtual shaft 58' shown in phantom lines and fitting inside virtual bore 58'' also shown in phantom lines in FIG. 29. The bore and the shaft are given diameters indicated as $\delta$ and $\delta'$ as references. $\delta$ is larger than $\Delta'$ and $\delta'$ is slightly smaller than shaft 58 diameter. The foil material is springy and the foil circularly shaped band forming a helical surface is preformed to adopt the shape shown in FIG. 27 when installed. Such a shaped springy and flexible structure may be both pulled to become extended and, coil after coil, given a larger diameter for passing over splines 70 when being assembled. When forced in place inside the flange bore and around shaft 58, the coils deform slightly to accommodate the dimensional limitation of the annular space offered between the bore and shaft 58. In FIG. 29 such local rotation of the coiled band is represented by the two arrows which apply to portions X and Y of the coil. Such a seal will only let a very small and negligible amount of oil leak by in the worst case, which is acceptable. This sealing construction is also used for a ball bearing system.

FIG. 30 presents a midsectional elevation drawing of such a ball bearing which may just as easily be a roller bearing as is described further on. However, the races of such bearings cannot be split in two separate parts as is the case of the former slip bearing type. The inner race of the bearing must be the outer surface of shaft 58 and the inner diameter of the outer race must be larger than $\Delta'$. The bearing may have balls such as 204 and 206 of FIG. 30. Rollers such as 205, shown in dotted line, may also be used. In any case, a longitudinal groove 207 cut in shaft 58 enables balls or rollers to be inserted between the two tracks of the two races, such as 208 on the inner race. A retaining cage 209 rotating with the balls (or rollers) is installed in place after all the balls have been inserted. Lubricating oil is introduced and channelled as was described for the slip type bearing, except that restricting orifice 201 is not needed here, the oil not needing to be under pressure. The locking and sealing constructions of the bearing may be identical to those previously described and thus need no further elaboration.

For all the engine constructions described above, all parts of shaft 58 for each stage, both for compression and expansion, have identical dimensions so that all bearings and flange bores may also be dimensioned identically. The end flanges and their associated bearings may be different and may be of the type of construction well known to people skilled in the art, thus need no further elaboration either. The engine presented herein may then be assembled following these major steps:

1. Assembling the vanes onto their respective rotors;
2. Assembling one end flange, its associated bearing and shaft 58;
3. Assembling one rotor stage and its external structure;
4. Assembling the first separating flange and its bearing;
5. Assembling the next rotor stage and its external structure;
6. Assembling the next separating flange and its bearing;
7. Repeating each couple of steps until the last assembly of rotor and associated external structure is mounted on shaft 58; and
8. Mounting the second end flange and its associated bearing on shaft 58, thus completing the engine assembly.

For engine configurations in which the vanes are mounted on the external structures, the ducting of either air or combusted gas between stages having the same function may be achieved from one stage to the next through the separation flange, from rotor to rotor. When the vanes are mounted on the rotor, such ducting may be incorporated in the external structure. The reader skilled in the art will understand such construction without the need of further elaboration. Ducting from the compression side to the expansion side must be done externally to and from the storage tank.

Referring now to FIGS. 31 to 41, various constructions of the power shaft bearings, rigid vane suports and articulations, and rotor centering between flanges are depicted showing how the use of high pressure air may eliminate solid friction between various parts moving relatively with one another. Eliminating solid friction disposes of the need for lubrication and minimizes wear of moving contiguous surfaces. In all constructions, use is made of the principle of opposing pneumatic forces in which the variation in the distance between two contiguous surfaces moving relatively with each other causes a net force to be developed, that opposes such distance variation, thereby playing the restoring role required to create a self adjusting force equilibrium, and spacing balance. The graph of FIG. 31 and the air flow schematic of FIG. 32 illustrate the principle operation. If two restricting orifices, one of fixed size 231 and the other of variable size 233, are mounted in series in a duct 230 in which compressed air at constant pressure $P_1$ is supplied and which vents into a volume in which a lower constant pressure $P_2$ is continuously maintained, the pressure $P_i$ in the volume between the two orifices varies as a function of the area ratio of the two orifices, as represented by the curve of FIG. 31 graph.

For a fixed area $A_1$ of orifice 231, large variations in size of area $A_2$ of orifice 233 causes the ratio $A_1/A_2$ to vary to the extent that $P_i$ may vary from $P_1$ to $P_2$ as a rough approximation. Practically, the ratio $A_2/A_1$ varies between limits corresponding to points a and b on the curve. The operating portion a-b of the curve represents a quasi linear relationship between $P_i$ and the ratio $A_1/P_2$, as long as the velocity of the air through either of the orifices remain subsonic, and pressure $P_i$ varies between practical operating limits $P_1'$ and $P_2'$. Pressure $P_i$ in volume 232 may then be applied on a piston such as 234 which will generate a force F varying linearly with $P_i$. An identical air flow circuit mounted in parallel with that which is just described may easily be imagined so that it develops another force F' opposing F and so that the variations of areas $A_2$ and $A_2'$ of orifices 233 and 233' (not shown) occur in reverse directions, for instance by making the sum $(A_2'+A_2)$ equal a constant. Such an arrangement is described in FIG. 33 which represents a self centering air bearing supporting power shaft 58. In such an arrangement, four air pads or cushions are used, opposing each other as a pair.

The drawings of FIGS. 33 and 37 illustrate shaft 58 being enveloped by four spaces such as 235 formed between shaft 58 outer surface 58', internal surfaces such as 236 of two half circular shells 237 and 238 butting against each other at joining line 239, and cheeks 240 and 242. Each space 235 is supplied with air at pressure $P_i$ by holes such as 241. Half shells 237 and 238 are positioned inside a bore in and supported by flange 126 that houses restricting orifices such as 243 located inside feed air ducts such as 244. Four separating walls such as 245 located between spaces 235 isolate each space from its neighbor. The only passage available to the air in spaces 235 is then between the inner surfaces of checks 240 and 242, and surface 58'. Such passages thus play the role of variable restricting orifices 233 or 233' mentioned earlier. It is obvious that when shaft 58 moves a given distance off center, one air passage increases while the oppositely located corresponding passage decreases, both by that given distance. The differential force $(F-F')$ generated by the difference in air pressures inside both opposite air cushions so formed resists whatever effort exerted on shaft 58 which caused the shaft off centering, and brings back shaft 58 on center. The same operating principle may also be applied to three other major components of the vane engine of the present invention.

A rigid articulated vane such as 56 of FIG. 4 is free to move laterally between flanges such as 126 and 128 of FIG. 24. Some clearances between the vane side edges and the restraining flange surfaces must of course be provided. At least one side edge of the vane will drag on one flange surface if the vane remains unrestrained, as rotor 55 rotates. It is advantageous to eliminate such dragging which will create heat and wear. To that effect, air cushions such as 250 may be provided on both sides of the vanes, as shown in FIGS. 34 and 35. The air cushions are contained internally on lands such as 251 which extend the length of the vane side profile contours. The clearances naturally existing between the land surfaces and the flange surfaces thus constitute two variable size restricting orifices when each air cushion space is supplied with high pressure air through ducts 252 and 253 housing fixed size restricting orifices 254 and 255. The reader will easily understand how a lateral displacement imposed on the vane automatically generates a restoring force that pushes the vane back in a direction opposite to that of such displacement, as was earlier described.

Air at pressure $P_1$ is introduced through channel 94 located in rotor 55 into articulation space 93 from where it enters duct 252 which connects with duct 253. If gas storage space 95 is used, it may be divided into two parts 95 and 95'. For the sake of simplification, some design features shown in FIG. 4 are omitted in FIGS. 34 and 35, which both correspond to the case of a rotating central body. In such case, the torsion bar spring of FIG. 21 is not needed. The vane self centering construction just described may also be applied to the engine construction shown in FIG. 20, provided that the necessary design adjustments are made to accommodate the torsion spring, in which case, air cushions 250 extend only from the vane tip to a location such as σ and ducts 252-253 need only be slightly relocated accordingly.

Rotors 55 are contained between and restrained by two flanges such as 126 and 128. They must be also free to slide slightly laterally on shaft 58 so that their rotations between flanges 126 and 128 are minimally hindered. Friction between the side faces of a rotor and the corresponding surfaces of its associated flanges may again be eliminated by using a similar air cushion balancing design. The drawing of FIG. 36 illustrates an available design approach that incorporates air cushion spaces such as 260 cut on the rotor sides and opening on flange 126 surfaces. Each air cushion space is supplied with air at a pressure $P_i$ introduced through hole 261 containing resticting orifice 262 and connected to air feed ducts such as 263 and 264. All air feed ducts are connected to a common source: duct 265 connected to the high pressure air supply. Most of the air escaping from the air cushions is collected in spaces such as 266 and evacuated by means of channels such as 267 which vent into a central channel 268 extending inside shaft 58 and vented to a low air pressure sink. Again, any lateral motion of a rotor causes forces to be exerted laterally on the rotor and which tend to recenter the rotor between its two associated flanges, all rotors being mounted on splines 70 in a manner such that the free lateral movement of the rotors needed for the air cushion operation is always facilitated.

The sizes and positioning of air cushions 260 are designed to accommodate other design provisions such as those described for the engine constructions shown in FIGS. 20, 24 and 25, i.e. inwardly to collecting groove 163. For the engine construction depicted in FIG. 4 (rotating central body and rigid articulated vanes), the air cushion may extend outwardly as shown in phantom lines as 260'. Lines 260' could also represent the outline of some branches of a star-like flat space between which wedge-shaped pads could be formed to provide a planar thrust bearing similar to and operating like the oil wedge slip bearing of FIGS. 27 and 28, but in which oil is replaced by air. The supplementary thrust produced by the nearing of the pads to flange 126 surface will add to the air cushion naturally-restoring forces. Such a design cannot be applied to the engine construction of FIGS. 20, 24 and 25, however, for obvious interference reasons.

The schematic diagram of FIG. 37 indicates the amplitudes of vane 56 swings between its fully retracted (folded) and protracted (extended) positions shown as I and III. Intermediate position II is also shown to illustrate the influence of the direction of the curvature of the inner surface of external bodies 57. An examination of FIGS. 2, 3, 11, 12 and 20 reveals that all vanes have to conform in some portions of their circular travels to both curvature types (B-C). The shape formed by their external surfaces in position I must be a circle (A) which matches the outer cylindrical surface 86 of the rotor of radius R. The angle Γ made by the two tangents, at a point such as D, to the external surfaces of vane 56 in extreme positions I and III is a measure of the maximum amplitude of the vane swing. Angle Γ represents a good approximation of the maximum variation in the angle that a reference vane tip tangent such as T makes with the tangent to curve C at point τ. Because the dragging of the vane tip on the inner surface of the external structure 57 can only signify wear and heat production, both undesirable side effects, it appears advantageous to equip the vane tips (free edges) with frictionless support pads riding upon the inner surface of external structures 57, using air cushions again to eliminate solid contacts.

The drawings of FIGS. 38 and 39 represent such a construction. Even vane tip is constructed to exhibit a bar 270 having a partially circular and hollow cross-section jutting outwardly on vane 56 body 271. Channel 272 located inside bar 270 is supplied in high pressure air by feed ducts such as 273 fed by channels such as 274 located inside body 271. Channel 272 thus supplies air through holes 275 to crescent-shaped space 276 which opens the holes 277 located at the top of upper part 278 of dome-shaped 279 which is structurally part of pad 280 structure. Although FIG. 38 shows a dome-shaped form for portion 279 of the pad structure, it represents only a cross-section thereof, and part 279 extends almost the whole width of the vane as shown in FIG. 39. The construction and operation mode of this assembly are similar to those of the vane articulation depicted in FIG. 4, whereby an articulation is provided which enables pad 280 to swivel about an axis parallel to the vane free edge by an amount Γ' that is slightly larger than Γ'. The vane is mounted with a small lateral play to accommodate the lateral position adjustment earlier described. The end faces of the pads are closed by cups such as 281 affixed to the pad structure forming one air cushion at each end of the pad represented by enclosed spaces 282. Holes such as 283 play the role of restricting orifices and supply pressurized air from the pad internal volume to spaces 282. The lateral positioning of the pads is thus automatically adjusted by the corrective action of air cushions 282, as previously described.

The pads may swivel freely around their articulation between the extreme positions 284 and 285 (phantom lines) to adjust to the relative local orientation of the surface on which they are compelled to ride. The major meaningful forces acting on the pads are those exerted outwardly by the vane resulting from centrifugal and pressure forces, and those exerted inwardly by the high pressure air present inside the pad and applied to an area defined by the distance between semi-contact points 0 and 0' and the length of the pad, acting in the direction of arrow f. Holes 277 are also sized to play the role of fixed restricting orifices so that they are mounted in series with the variable size restricting orifice formed by the pad contact perimeter just defined times the average distance separating such contact perimeter from the pad-riding surface. When such distance increases, the air pressure inside the pad decreases and the vane swings correctively further outwardly, and when the distance decreases, the air pressure inside the pad increases which results in an inwardly corrective swing of the vane. Thus the vane tips ride on a self-adjusting air cushion, thereby preventing continuous solid contact between the free edge of the vane (or tip) and the inner surface of the external structure 57.

FIGS. 40 and 41 illustrate how high pressure air may be ducted through the vane articulation at a pressure higher than that which is maintained in bearing spaces such as 93' of the vane articulation. To that effect high pressure air is brought through channel 94 and that air flow is then divided into two separate air flows: one leaking underneath lands 291 formed by separating wall 290 into spaces 93' and 93"; the other entering duct 252' located in the vane structure for supplying air to the pad. Air at intermediate pressure for the two air cushions is provided by channels 253' and 253" out of spaces 93' and 93", respectively. The pad and the vane air cushions are thus supplied from different sources with air at the most appropriate pressure, the operation of one air cushion system being thus independent from the operation of the other air cushion system. Because the air passage under lands 291 is small and could vary appreciably from time to time depending upon the vane swinging position, two small grooves 292 and 293, of calibrated size, are cut on lands 291 so as to provide an additional and substantial fixed-size air passage. This insures that air cushion spaces 93' and 93", and air cushions 250 are constantly supplied with pressurized air at an adequate pressure level.

The total amount of air flowing between the riding pad and its riding track may vary appreciably from time to time because the area of the variable size restricting orifice formed between the two components has no physical upper limit, contrary to other air cushions. To insure that the formation of an air cushion is always adequate, the shape and construction of the pad must be such that mechanical conformance between pad and track exists for all local curvatures of external surface 57 inner surfaces. As examplified by the drawings of FIGS. 12 and 13, such local curvatures could even be inverted. For that reason, the top of the upper part of structure 279 is located under a straight line joining points 0 and 0' so as to enable the pad to ride over any slightly inverted curvatures of its track.

For a similar reason, the lips 296 and 298 of the pad are also slightly bent inwardly so that reversed curvatures may be appropriately handled, without appreciably affecting the locations of points 0 and/or 0'. From time to time, the pad may tilt from its neutral position and contact the track along a line passing through point 0 or 0'. In such an instance, the friction forces developed are of a magnitude much lower than that of the forces which a padless vane tip would otherwise experience. Another reason for inwardly overbending lips 296 and 298 is to insure that the locations of points 0 and 0' do not change appreciably when the track curvature varies, which would otherwise affect the forces exerted on the pad, hence its distance from the track.

High pressure air for the rotor air cushions may easily be piped inside the flanges, however, high pressure air for the vane articulations, the vane air cushions and the pad air cushions requires channelling inside the rotor body and to the vane articulations. The only practical access to the rotor is by means of shaft 58. Although rotors 55 are loosely mounted on common shaft 58 and slidingly secured by splines 70, some minor relative motion between shaft and rotor must be allowed. High pressure air must be ducted through the shaft/rotor sliding joint (splines 70) and sealed off. Elongated bellows 300 (FIG. 36) located mostly inside radial bore 301 in rotor 55 body provides such degree of freedom concomitantly with the air seal.

The bottom flange of bellows 300 is secured in short bore 302 in shaft 58 which opens into high pressure air duct 303 inside common shaft 58. Countersink 304 clears the spline depth. At the top, bellows 300 flares out so as to enable locking screw 305 to seal and secure the bellows upper portion. Holes 306 in the bellows wall enable the high pressure air to flow into collector 307 and then into supply ducts such as 308 to each vane articulation on rotor 55. The length of the bellows is such that the two bellows ends may move laterally with very little effort needing to be exerted. Small air leaks are permissible and positive solid contacts between two mechanical parts such as the bore surfaces and the bellows walls suffice to limit such leaks down to an acceptable minimum level. To that effect, swelling 309 of the bellows wall is forced inside bore 301 at the top and cylindrical flange 310 at the bottom is made to bulge out into a cooperating groove located in the wall of bore 302 (details not shown), at the time the bellows is installed.

One such provision per rotor suffices. Radial bores 301 are positioned between two vane articulations. The air ducts connecting collector 307 to the vane articulations are drilled through the rotor body. The bellows are installed as follows: during the engine assembly, before an external ring of the external structure is mounted, a rotor 55 is first brought in place from the free end of the common shaft. Bellows 300 is inserted inside bore 301. Flange 310 is flared out with a tool fitting inside the bellows. The bellows top is pushed in to bring the upper conical flange in place and force swelling 309 in position. Screw 305 is then tightened. The external ring may then be positioned around the rotor. The vanes can then be dropped in place.

The drawings of FIGS. 42 and 43 illustrate a construction of a semi-rigid vane articulation in which the vane portion connected to the central body or rotor is flexible so as to permit vane bending. Contrary to the construction shown in FIGS. 16–18 of another type of semi-rigid vane which still allows some flexibility of the vane body, the swinging part of the vane now being described is rigid. This alternate construction of a semi-rigid vane is structured to provide means for channelling high pressure air into the vane body for use in vane air cushions.

The flexible part of the vane is fixedly connected to and installed in the rotor structure. It is locked in place by rigid linear bead 46' in rotor 55 and can move neither longitudinally nor laterally. The rigid portion of the vane body consists of two sheets 38' and 39' connected by stiffeners (not shown) so as to form a closed unidirectionally-curved box. The free edge of the vane is equipped with an air cushion pad operating and mounted as previously described. The vane rigid portion plays the role of the end of the rigid vane shown in FIG. 38 and constitutes the ducting assembly of the high pressure air. This air is brought through ducts such as 320 inside rotor 55 to enclosed manifold hole 321 from where it is ducted to curved closed box 322 by means of a plurality of holes 323 connecting manifold 321 to the inner face of box 322. Matching holes located in the wall 322' of that box are positioned to align with holes 323. The fitting of box 322 in its lodging is tight and practically seals the interface between the box and the outer surface of wall 322'. The air thus can flow with minimum air leakage between holes 323 and the inside of box 322. A plurality of small ducts 324 rendered flexible by means of their cross-section shape are affixed to the inner side of sheet 39' made of springy material and connect with the larger size box 325 of the vane body.

Small flexible ducts 324 may be brazed to springy sheet 39' as represented by fillets such as 326. As the flexible portion of the vane bends from its fully deployed position shown in FIG. 42 to its fully folded position (sheet 38' against surface 84), the unconstrained quasi-"flat" sides of ducts 324 further flattens to accommodate such bending, as do "Bourdon"-type tubes of some metallic barometers or pressure gauges. As earlier mentioned, because lateral sliding is prevented, no relative motion of the flattened out surfaces of these ducts is allowed with respect to the external surface of supporting wall 327.

DISCUSSION AND OPERATION

A generic defect is congenital to all vane engines which incorporate the use of sliding vanes: that of the friction of the vanes against their guiding and restraining surfaces. The engine construction disclosed herein for the present invention disposes of such friction, at least between surfaces moving at high relative velocities and onto which substantial pressures are applied. Such improvements are apparent when the present construction is compared to that of conventional vane engines and may be listed in the order the causes of friction are eliminated or greatly reduced, as follows:

1. the sliding friction resulting from the alternating motion of the vane in and out along its radial guiding surfaces (FIG. 1) can be almost eliminated by replacing the sliding motion with a swinging motion which greatly reduces such relative velocities;
2. the presence of clearances or plays between moving parts can be constantly assured while continuously enabling the automatic relative position adjustment of such parts;
3. air and/or gas leakage through these clearances may be either rendered tolerable or positively and beneficially controlled;
4. preferential mounting modes of the vanes on either the moving or stationary portion of the engine offer the possibility of beneficially utilizing or eliminating the effects that centrifugal forces exerted on the vanes may have; and
5. loose mounting of the rotary portion of the engine with respect to the stationary portion which allows a continuous and automatic self positioning of one portion relatively to the other.

Such construction improvements may be used collectively or combined as seems most appropriate and beneficial for each basic engine construction being adopted. A list of engine construction features resulting in such improvements is presented below.

1. Rigid vanes having an articulation made jam-proof, self-cleaning and quasi self-sealing, made conformable by means of a facilitated swinging action about the articulation (FIGS. 4, 15 and 6).
2. Fully flexible vanes fixedly mounted along one edge and made conformable by enabling the vane to bend and/or spring back as the restraining surfaces mandate (FIGS. 5 and 19).
3. Partly flexible vanes fixedly mounted along one edge and rendered both locally rigid and conformable (FIGS. 16 and 18).
4. Construction provisions for enabling the vanes to nestle inside cavities provided on the surface onto which they must fold back and to form a continuous cylindrical surface when folded so that effective sealing may be assured as a seal passes by (FIGS. 2, 4, 6, 11, 12, 14, 16, 20, 23, 26 and 37).
5. Construction provisions for enabling the vanes to move freely laterally (sideways) (FIGS. 4, 15, 16, 34, 35, 39, 40 and 41).
6. Constructions provisions for enabling the central rotating bodies of one engine to slide freely laterally on a common shaft (FIGS. 11, 24 and 36).
7. Construction provisions for utilizing the centrifugal forces acting on the vanes to facilitate the vane deployment (FIG. 19).
8. Conformable seal construction for insuring the continuous and constant stoppage of compressed air and/or combusted gas between two contiguous chambers (FIGS. 14 and 26).
9. Construction provisions for insuring that a folded vane will automatically swing out and deploy from its folded position (FIGS. 4, 8, 10, 14 and 21).

10. Construction features that allow selecting the rotating portion of the engine and of the mounting of the vanes thereto (FIGS. 2, 3, 12, 13, 20, 24 and 25).
11. Construction provisions for enabling a common shaft to be supported by the flanges separating contiguous central body assemblies and especially constructed bearings which facilitate assembling the various engine parts together (FIGS. 11, 24, 27, 28, 29, 30, 33 and 36).
12. Torsion bar spring construction located inside a rigid vane articulation for providing an unfolding torque on the vane (FIGS. 20, 21, 22 and 23).
13. Construction provisions for utilizing air cushion bearings between contiguous central body assemblies (FIGS. 33 and 36).
14. Construction provisions for enabling the centering of rotating bodies by means of high pressure air applied between neighboring separation flanges (FIGS. 32 and 36).
15. Construction provisions for utilizing high pressure air to center vanes between two neighboring separation flanges (FIGS. 32, 34, 35 and 41).
16. Construction provisions for replacing the solid friction of the vane end tips by an air cushion ride (FIG. 38).
17. Construction provisions for ducting and automatically regulating the flow of high pressure air to these various air cushions (FIGS. 32, 33, 34, 35, 36, 38, 39, 40 and 41).

In one way or another, the use of high pressure air can be of beneficial use in the operation of the improved vane engine of the present invention. The use of such air may be illustrated by the curve of FIG. 31 in association with the schematic drawing of FIG. 32 in which two restricting orifices are mounted in series inside a duct. The upstream orifice (231) has a fixed size and the downstream orifice (233) has a variable size, which is generally the case in the present invention applications. Air at high constant pressure $P_1$ is introduced upstream of orifice 231 and leaves orifice 233 to vent to a much lower pressure $P_2$. The air pressure $P_i$ existing inside volume 232 varies as the size of orifice 233 is caused to vary. It is usual to represent the variations of $P_i$ as a function of the ratio of the areas $A_1$ and $A_2$ of the two orifices, assuming that the air is supplied at constant pressure and vents at a much lower pressure. Such variation of $P_i$ as a function of the area ratio is represented by FIG. 31 curve. Practically the relative sizes of the orifices and the variations of their area ratio are kept such that the range of variations of $P_i$ corresponds to the quasi-linear segment a-b of the curve of FIG. 31.

If air pressure $P_i$ in volume 232 is applied on a piston 234, a force F is then developed by piston 234. F is equal to the product of the piston area multiplied by $P_i$ less the back pressure $P_2$ which may be applied on the other side of piston 234. It becomes immediately apparent that the adjustment of orifice 233 size results in a concomitant adjustment of force F. The response of piston 234 to size variations of orifice 233 may be exploited in two basic manners: (1) to oppose a force imposed on the free side of piston 234 (in a direction opposite of that of F), and (2) to balance piston 234 between force F and another force F' of opposite direction and which could be generated by a pressure $P_i'$ created by a high pressure air circuit mounted in parallel with that of FIG. 32. Both basic uses of such pneumatic potentiometers are applied to various parts of the present invention vane engine. Specifically, the first use is applied to the riding action of the air cushion pad mounted on the vane tip end (FIG. 40) and the second use is applied to the automatic centering action required of the following components: the air pad structures, the vane bodies, the central rotating bodies and the central portion of the common shaft.

In the case of the air cushion pad particularly, the high pressure air travels through several channels connected in series which are connected to the equivalent of restricting orifices mounted in parallel anong the way. In order to supply air at an adequate pressure (only slightly lower than $P_1$), pressure drops in the various channels and at the channel connections must be kept low. This can easily be achieved by properly sizing these channels, allowing ample passage for the air at the points where such channels connect whilst taking into account the side air flows leaving through the restricting orifices mounted in parallel. Readers familiar with the art will readily understand such design aspects of the invention construction.

However, though the sizing of the various channels and of the variable size restricting orifices can easily be established and maintained at room temperature, the effects of temperature changes and resulting thermal expansions affect the sizes of the variable restricting orifices and this needs further discussion. A simple example is used to that effect, that of the centering of a vane between two flanges. The drawings of FIGS. 11, 34, 35 and 36 may be used as a reference. Vanes 56 and rotor 55 are restrained laterally by flanges such as 126 and 128. Fanges 126 and 128 are fixedly connected by means of external ring structure 57 and the distance between facing surfaces of these flanges is fixed. Whether or not air cushions are used for centering rotor 55 and vanes 56, some clearance must always be provided between the flange surfaces and the side surfaces of both the rotor and the vanes. The use of air cushions simply means that this clearance must then be larger, though disputable, as later discussed.

It is unlikely that the materials used for these parts and the operating temperatures that they reach will be the same. Differential thermal expansions between such parts must therefore be dealt with. Using air cushions eliminates or at least greatly reduces the risk of solid friction between these moving parts. Thus the need for lubrication and cooling can be altogether eliminated. The use of materials characterized by very low thermal expansion may thus be envisaged for such parts, whereas the common shaft and the flanges which may safely thermally expand can be made of other suitable materials. Some low thermal expansion materials are also characterized by high strength at elevated temperatures. Likely candidates are reinforced graphite or carbon and ceramics, some ceramics exhibiting no thermal expansion.

Another consideration is that of the amount of high pressure air which can be used for the operation of the air cushions. This air represents a loss in two ways: (1) it is not used for producing power, and (2) it must be further compressed to a pressure substantially higher than that of the readily available compressed air. Because the external combustion engine of the present invention generally operates at lean fuel/air ratios, the excess air may be used either at the time of the fuel combustion or later by adding fresh compressed air to the combusted gas, in the manner that it is performed in gas turbine combustion chambers. Thus, the only meaningful energy loss results from the further compression of the compressed air, although some of that energy is recovered later through its expansion with that of the combusted gas. Also the elimination of lubrication and cooling reduces the amount of energy losses which would otherwise have occurred. In conclusion, the amount of air available for the air cushion operation could safely be an appreciable portion of the compressed air flow. The amount of clearance between moving parts of a vane engine of conventional design (sliding vanes) provided with cooling and lubrication would be the same or even larger than that which an air cushion operation requires. Assuming a mean clearance of a few thousandths of an inch on each side of either the rotor or the vanes appears realistic, if materials with nil thermal expansion, in the range of operating temperatures of those components, are contemplated.

The variable size restricting orifices thus generally consist of elongated narrow passages having a length along the air flow several times (the width of a land such as 251 of FIG. 34) their smallest dimension (the clearance). The typical discharge coefficient of an orifice with such shape is much lower than that of a fixed size restricting orifice such as 254 or 255 of FIG. 35 and such an effect becomes even more pronounced as the clearances close up, which means that the variable orifice effective areas may correspond to only half of their physical areas (length of the land contour times the clearance amount). Although such length may seem inordinate compared to the dimensions of the space available for housing the fixed size restricting orifices and the high pressure air ducts inside the vane body, it is nevertheless possible because: (1) several supply parallel ducts may be used inside the vane body, and (2) of the narrowness of the clearances just discussed, if kept under control.

The thickness of rigid vanes is large enough to provide ample volume for locating such parallel ducts (FIGS. 34 and 35) and the diametrical size of the vane articulation can also be made large enough to accommodate a plurality of large size ducts and duct connections (FIGS. 15, 39, 40 and 41). Because the vanes do not slide in the rotor, a large volume is available inside the rotor body for locating the high pressure air channels feeding the vane articulations (FIG. 36). Because the rotor/vane assembly moves with respect to the flange/external-structure assembly, high pressure air must be brought inside the rotor central body for subsequent distribution. The only engine component consisting of one continuous structure and being partly located outside the engine body, and having an interface with all the rotors, is the common shaft. The high pressure air is thus introduced in a channel, at one of its two ends by means well known in the art such as a sealed rotating joint (not shown), located inside shaft 58.

All rotors are slidingly mounted by means of splines 70 and must be free to slide along the splines. Also, some angular play must be allowed and is provided between the rotor female splines and the shaft male splines. The high pressure air must therefore be "flexibly" ducted between the shaft air channel and each central body. The total amount of relative displacement between the shaft external surfaces and the rotor internal surfaces is very small (less than 1/32 inch, in the worst case) and the distance available between the shaft high pressure air channel and a location inside the rotor where the air may be collected for distribution to the vane articulations is much larger (inches). In addition, absolute perfect sealing of the air ducting between the two components is not required and some reasonable lateral loads exerted therebetween are acceptable. A flexible wall pipe, restrained at both ends only with one end in one part and the other end in the other part, may provide such ducting. The elongated bellows structure 300 of FIG. 36 represents such a construction.

One large section flexible pipe 300 may suffice for one rotor and its associated vanes. However, enough space and interface area are available to accommodate one smaller diameter pipe for each one of the vanes of one rotor and the rotor air cushion. The axes of several smaller pipes need not be located in the same plane and may be evenly distributed angularly along the length of the rotor. The assembling of the flexible pipe(s) between the rotor and the common shaft is described in the previous section.

The high pressure air is supplied by a compressor driven by the engine. Some of the compressed air delivered by the engine if filtered and then ducted to the compressor inlet. The compressor output is pressure regulated ($P_1$) and supplied to the shaft internal channel. As earlier mentioned, this air becomes eventually mixed with the compressed air and the combusted gas present inside the vane engine, some of it being thus recycled and the balance being exhausted externally. The construction of FIG. 36 indicates that the high pressure air for the rotor air cushions and the air bearings is channelled through the flanges. As just mentioned in the case of the rotor air cushions, all of this air could by supplied through the shaft. If deemed advantageous to segregate the high pressure air circuits and use the flanges for partial ducting of the high pressure air, the compressor output is then split accordingly between the two separate air circuits. Air cushioning of semi-rigid vanes is discussed later on.

Vane Sizing and Proportioning

In the present vane engine, although space inside the rotor is not needed, the external surface area available around the rotor is utilized for lodging the vanes in their folded positions. The sum of the lengths (distance between the vane restrained edge and free edge) of all vanes on one rotor must necessarily be less than the length of the rotor circumference. The amount of angular motion of a vane is approximately established by the ratio of the vane length to the maximum radial distance separating the rotor external surface from the surface of the track on which the vane free edges ride. That distance is related to either the compression ratio or the expansion ratio which the vane swinging motion will yield. As a useful reasoning expedient, one may neglect the vane thickness and assume that a large number of infinitely thin vanes are used. One may also assume, as an rough approximation, that both air and combusted gas are both introduced and exhausted during a very small fraction of one revolution of the rotor. The exhausting of compressed air and the introduction of combusted gas then theoretically occur when the distance between the rotor external surface and the vane free edge track reaches a minimum. If the maximum of this distance is D and the minimum is d, the compression ratio r (or expansion ratio as applicable) can be expressed as D/d.

If n vanes are mounted around a rotor of diameter $\phi$, the length of a vane L may be expressed as $2L \leq \pi\phi/n$. The swing angle V (FIG. 7) of a vane expressed in radiant fraction, for small angles and large values of n, may be approximated roughly as D/L. Thus L=D/V and assuming that contiguous vane edges touch when folded back, $L=\pi\phi/n$. It results that $D/V=\pi\phi/n$, again as a very rough approximation. Examination of the vane configuration drawings of FIGS. 4 and 16 for examples reveals that practical values of 18–20 degrees and 25–30 degrees for the maximum value of V in the cases of rigid vanes and of flexible vanes respectively appear reasonable or $\pi/10$ and $\pi/6$, if expressed in radiants. Replacing V by these values in the last equation yields: $D=\pi^2 \cdot \phi/10n$ for rigid vanes, $D=\pi^2 \cdot \phi/6n$ for flexible vanes. $\pi^2$ being roughly equal to 10, one can then simply express D as follows: $D=\phi/n$ for rigid vanes, $D=2\phi/n$ for flexible vanes; or $n=\phi/D$ and $n=\phi/2D$, respectively. d has the same value in either case and can also be expressed as a fraction of $\phi$, for a given engine size. As earlier mentioned, d and D are related by the compression ratio r.

Another consideration of practical interest is the ratio of the "working volume" of the engine compared to its "dead volume". The working volume corresponds to the volumes in which the air compression and the combusted gas expansion take place. The dead volume corresponds to the volume of the central body which does not contribute directly to the production of energy. The latter should be kept at a minimum value, being non-productive and "costing" space and consequently being the cause of a weight penalty. As a very rough approximation, the working volume varies as $D\phi$ and the dead volume varies as $\phi^2$. The ratio of working volume to dead volume, or space usage efficiency, is thus $D/\phi$, as one could intuitively have guessed. This ratio $D/\phi$ is, as above discussed, also directly inversely proportional to the number n of vanes mounted on the rotor. Thus attempting to save space appears to dictate the adoption of the smallest possible number of vanes.

Still another consideration must now be examined: that of the "dead angular rotation" of the rotor, which also signifies a loss of space usage. This dead angular rotation corresponds to the angle that the rotor must rotate between a position where one edge of the vane starts contacting seal 59 (FIG. 2 or 4) and that in which the other vane edge becomes free of any contact with such seal. As a rough approximation again, this angular rotation is basically $2\pi/n$. The corresponding "lost" volume relatively varies as $D/n\phi$ for each seal and varies directly as the inverse of n, but as $D/\phi$.

Another aspect to consider now is the possibility of combining both compression and expansion on one rotor or of having one rotor-vane assembly performing only one of the two functions. The former means two seals (less space efficient) and a much reduced fraction of a rotor revolution being available for each function, hence a larger number of shorter vanes (more space loss). The latter means one seal (higher space efficiency), a more gradual variation of vane swinging and a larger fraction of each rotor revolution being available for the performance of either functions, at the expense of using twice as many rotors and twice as many separation flanges. Also the dual use of any rotor means that a vane must be constructed to perform in both environments (cooler compressed air and hotter combusted gas) and be capable of operating in two opposite directions (see the decription pertaining to FIG. 20 for instance), as is discussed later on.

The second basic dimension of a vane to be considered is its width, the ratio of its width to length being referred to as its aspect ratio $\rho$. The vane appears narrower as $\rho$ is made larger. The nature of the vane (rigid vs flexible) influences the importance of that ratio, e.i: rigid vanes have a larger torsional rigidity and are better guided by their articulations. Rigid vanes are thus better adaptable to higher aspect ratios, for a given total permissible amount of vane twist which may be due to either a nefarious build up of construction tolerances or an unexpected lack of uniformity of the forces applied along the vane width, or even the compounding of both effects. The semi-rigid vane construction comes closer to that of the rigid vane, but the fully flexible vane construction of FIG. 5 certainly is the least desirable from this standpoint, even if equipped with an edge stiffener as shown in FIG. 19. An aspect ratio range of 1/1 to 2/1 would adequately cover most acceptable vane configurations.

Also, because flexible vanes are capable of a larger swing arc, dimension D must again be considered as an important design parameter. Everything else being equal, D for flexible vanes is about 30% to 45% larger than D for rigid vanes, which explains also why flexible vanes will twist more than rigid vanes during a full swinging arc and should thus have a smaller $\rho$. As a whole and as a first approximation, the volumetric usage efficiency of either type of vanes should not be that much different, at least not enough to establish a clear cut advantage in favor of either vane construction, yet. Another basis of comparison is needed.

This basis for comparing vane constructions emerges when one considers the need for and influence of staging. For any given engine compression ratio, and thus expansion ratio, of an engine of specified maximum power $\tau$ max and maximum rotation speed Nmax, a well determined are volume must be compressed per unit of time. The volume of air admitted for a given vane type is proportional to D, $\rho$ and $\phi$. The overall compression ratio R of the engine is approximately $r^m$, if m is the number of compression stages mounted in series; whereas the compression ratio across each vane is only $r^{(1/n')}$, if n' vanes are required for "one-stage" compression. The dimension d earlier defined now comes into play in two ways for a given D: (1) the smaller d is, the larger r is and the lower m is; and (2) the smaller n' is and the larger m is, the larger the pressure difference across the vane and exerted thereon.

Large differential pressure values across the vane result in two undesirable effects: (1) the air (or gas) by-pass leaks around the vane side edges increase considerably, and (2) the deformation of the vane caused by these pressure loads may result in even larger by-pass leaks and also in unwanted structural overloading of the vane body. Only concurrently conducted designs and tests thereof will establish workable and acceptable boundaries for the optimum values of d and m. However, because values of $\rho$ between 8 and 11 appear most desirable from the thermodynamic standpoint, at least two and possibly three stages will be needed for the compression and possibly three to four for the expansion, in order to take full advantage of the Brayton-type cycle which the present external combustion engine should make use of. This indicates best values of d between $\frac{1}{8}$ and $\frac{1}{4}$ of D.

The geometrical definition of d is somewhat less clear than that of D. This is due to the practical facts that the compressed air cannot be exhausted and the combusted gas cannot be admitted during the eqivalent of a very small amount of rotor rotation, which was the simplifying expedient assumption previously made. Careful examinations of the drawings of FIGS. 9 and 10 (air exhaust and gas admission ports), of FIGS. 12, 13 and 20

(gradual approach of the vanes to the seal) indicate the reason thereof. For this reason, the dimension d is typically indicated as shown in FIG. 2 for instance, an appreciable angular distance away from the start of port 67 opening edge. The above-discussed staging background now introduces the need of a better understanding of the vane static and dynamic behaviors.

Vane Mounting and Staging Modes

The vane behavior and response to loadings depend upon the type of the vane, the manner in which it is mounted, which body it is mounted on, whether that body is rotating or remains still and whether that vane performs only one single function or assumes a dual role (compression and expansion). From the results of the above discussion, it appears that the single function assignment operation mode may generally be more beneficial. This case is used as a model for most of the following discussion. The case of the dual usage of vanes is first briefly examined, as examplified by the drawings of FIGS. 20, 21, 22 and 23.

In FIG. 20, rigid vanes are mounted on the external body 57 and the internal central body (rotor) rotates. The vane free edges ride on the rotor outer surface. A digression seems appropriate at this point regarding vane mounting on the external structural body 57. The shape of the inner surface of that body must be cylindrical if all vanes are to be identical, which is considered a practical must. The length of its circular contour determines the maximum number of vanes that it can accommodate, for a given vane length. For a given working volume, it is obvious that this number $n''$ of vanes is larger than n, previously defined. This fact renders the dual use of the vanes less disadvantageous than is the case of rotor-mounted vanes and a pair of chambers and seals are thus shown in FIG. 20.

These two chambers may be used as follows: (1) each chamber is used as one stage of a two-stage compressor for instance, and (2) one chamber is used to compress air and the other is used to expand combusted gas. In the first case (rotor countours 71 and 77, vanes 56 and 56' in the position shown), all the vanes are identically pressure loaded. In the second case (rotor contour shown in solid lines), the direction of the pressure loading of a vane with respect to its structure must reverse itself twice every rotor revolution. Because the vanes do not rotate, they are subjected only to the differential pressure loading, which can easily be assessed. Thus it is possible to spring load the vanes for balancing such loads, setting the spring so that the vane tip will never lift off the rotor outer surface. A choice is now required, that of the orientation of the vanes so as to minimize the friction developed between the vane end tips and the rotor outer surface. A study of the force diagram of FIG. 22 is now in order.

Vane 56 of FIG. 22 is subjected to a moment M exerted by torsion spring 141 about the vane axis of rotation. The pressure difference across the vane and applied to the vane surface generates a total force Fg (or F'g of opposite direction depending on the direction in which the pressure differential is applied). Fg can be replaced by two forces: F and another force exerted along axis X-Y at the vane articulation (force f'g not shown to scale). Force F can be replaced by two forces Fn (normal to rest surface 77 of rotor 55) and Ft (tangent to that surface). Moment M exerts a force Fq at contact point C. Fq can also be replaced by two forces F'n and F't in the directions of Fn and Ft respectively.

F'g results in force F' which may also be replaced by two components of opposite directions to Fn and Ft. In the first instance, F adds to Fq and, in the second instance, F' substracts from Fq. If vane 56 is never to break contact with surface 77, Fq must always remain larger than F'.

The question now is: which one of forces Fg and F'g should be associated with a rotor rotation of direction F? The answer constitutes the choice earlier mentioned. The rotor surface velocity is the same in both cases but its temperature is quite different depending upon the function performed by this side of the rotor: air compression or gas expansion. Logically, lower surface temperatures should preferably be associated with high vane tip friction, and vice versa. Thus it would seem advantageous to associate Fg with air compression and F'g with combusted gas expansion. Therefore, it will be assumed that the torsion spring torque is set to oppose the combusted gas pressure differential across the vanes and consequently must add to the compressed air pressure differential across the vanes. The total amount of vane tip friction is thus larger than would otherwise be the case, by that fraction which corresponds to the excess force difference (Fq−F'). Such a penalty may not justify the use of air compression and combusted gas expansion chambers on diametrically opposite sides of one rotor. The use of two diametrically opposite chambers having the same function does not create such problem, as earlier mentioned, and appears more attractive if and when it seems advantageous to use the rotor arrangement of FIG. 20. The rotor half contours are then not symmetrically shaped and the chambers formed thereby are connected in series, be it when performing an air compression function or a combusted gas expansion function.

The other unique aspect of vane loading is represented diagrammatically in FIG. 7 where vane 56 is articulated at point 0 on the external surface of rotor 55 which may rotate in direction f or f'. The vane tip makes contact with the inner surface of external structure 57 at point T. Regardless of the rotation direction of rotor 55, vane 56 of length L is subjected to a centrifugal force Fc applied at its center of gravity G located approximately at a distance L/2 from the vane tip. Fc can be replaced by its components Fe and Fr. The vane thus exerts loads Fe and Fr along its two opposite edges against the external structure and the rotor outer surface respectively. These forces are caused by the rotor/vane assembly rotation and are to be superimposed onto those forces just discussed (FIG. 22) created by the pressure differential exerted on the vane body. Fc is always exerted outwardly and adds to force F'g but opposes force Fg. As a rought approximation, Fc acts like force F' of FIG. 22, but with two differences: (1) its magnitude varies as the square of the rotor rotational speed, therefore is far from constant, and (2) the ratio of the magnitudes of its two components may vary greatly with the vane swing arc V (whereas the torsion spring of FIG. 21 could be constructed to develop an almost constant moment over the vane total swing arc). Depending upon the operational function assigned to the vane and its orientation, the centrifugal forces may be used to decrease the vane tip friction resulting from pressure loads on the vane, or it will add to them.

If the vane is mounted on a rotating external body (case of FIG. 3), in FIG. 7, T becomes 0 and 0 becomes T functionally. However, Fc is still directed outwardly and tends to fold back the vane on rotating external body 57. Depending again upon the usage mode of the vane, the centrifugal forces exerted on the vane may decrease the vane tip friction or must be counteracted by a torsional spring moment arranged to overbalance the action of the pressure-differential forces. Whether vane tip friction is present or the vane tip is equipped with an air cushion pad, the importance of these forces and their variations must not be ignored. They intricately enter into and affect the vane deployment from its folded position and the amount of extra loads required on the vane tip to force the vane to fold back from its deployed position. This is even more so in the case of dual function configurations such as those of FIGS. 12 and 13.

The vane tip edge follows a guiding surface also called rest or riding track. At high vane/rotor assembly rotational speeds, it is desirable to avoid rapid changes in the rate of swing arc variations, in either directions, so as to prevent vane bouncing. This condition dictates that the vane tip edge is caused to move radially at constant velocity, or that this edge describes an Archimedes' spiral arc. This is easily done during a large portion of one rotor revolution. However, over the remaining small portion of that revolution (one function per revolution), the total radial transitional step D must be covered as fast as possible, so as to minimize the "dead angle" during which either the atmospheric air is introduced or the combusted gas is exhausted. It is referred to as dead angle because no power is generated during that part of the rotor revolution. In FIGS. 12 and 13, it corresponds to about $\frac{2}{3}$ of $2\pi - (\beta$ or $\gamma)$, or $2\pi - (\beta'$ or $\gamma')$ as is applicable. It is assumed that the exhaust of compressed air or the introduction of combusted gas is performed during the remaining $\frac{1}{3}$ of these values, as graphically represented.

In a single function configuration (FIG. 12), whether pertaining to air compression or combusted gas expansion, it seems logical to orient the vane swinging in a way such that any pressure differential tends to force the vane deployment. In such case, the vane is caused to fold by means of its tip edge being gradually forced to close the gap between its lodging wall on the rotor and its inner surface, for a compression function. For an expansion function, the vane remains folded until its tip edge clears seal 59 edge, at which position a combusted gas "jet" forces the vane free edge to follow its guiding surface gradually. At the beginning of a compression cycle, the vane that just passed seal 59 is free to start deploying. Its outer surface remains shouldered by portion 0 of the inner surface of external structure 57 until the vane tip edge reaches edge i of the air admission port, assuming that vanes 56' rotate CCW. From edge i to edge j corresponding to the closing of that port, the vane tip edge must move as rapidly as possible and appears to "scoop" air in. From point j onward, the vane tip edge follows the Archimedes' spiral path previously mentioned. Between points i and j, over the port opening (see FIG. 9), the curvature of the vane track is critical. The transition from vane deployment to vane folding back must not be brusque, lest such action trigger vane bouncing off the track. At this juncture, no differential pressure of any consequence is applied on the vane. The existence of a prompting force is certainly advantageous then. At high rpm's, the centrifugal force discussed earlier provides such prompting action. At low rpm's, centrifugal forces are too small. A torsion spring is useful then. Also, the spring force provided by flexible or semiflexible vane constructions assures such action. The freely articulated rigid vane construction (FIG. 4) may demand some assistance in this regard. A leaf spring located between surface 84 and the inner surface of vane 83 will suffice. A small expansion bellows located in rotor 55 and internally pressurized, positioned between duct 90 and the articulation, will also provide a similar and sufficient assistance.

In the case of the expansion function (single function use), the vane unfolds gradually as described above. The pressure differential tends to maintain the vane deployed. At point j (vanes 56' rotating CW then), the vane free edge then moving still outwardly just before that point must change its radial motion direction and move inwardly from then on. Some residual gas pressure still pushes the vane outwardly and no vane bouncing appears likely to be induced at that time. The vane tip edge is continuously forced inwardly until it reaches seal 59 edge, the vane having then reached its fully folded position. Therefore, it would seem that the configuration of FIG. 12 could induce some vane bouncing but only at the beginning of a compression cycle and at low rpm operation. It was also demonstrated that simple solutions to this problem are available.

In the case of the dual function configuration of FIG. 13, the operation of the gas expansion vane shown on the right side is similar to that which was just discussed and needs no further elaboration. The swinging movements of the vanes only happen twice as fast, for an equal angular velocity of the rotor. However, on the left side where compression takes place, vane 56 shown in phantom lines is pushed inwardly by force Fp resulting from the pressure differential and pushed outwardly by centrifugal force Fc, actions previously discussed. Some amount of torque exerted on the vane articulation is needed, especially at low rpm's. The vane is also allowed to deploy very fast as soon as its free edge clears seal 59", much faster than is the case for FIG. 12 arrangement. The vane outer surface engages seal 59 near its articulation and the vane is then kept folded until its tip edge clears seal 59. No vane bouncing is possible then.

Generally speaking, leakage of either compressed air or combusted gas around an engine component which is intended to control the flow of such energy-producing leaking fluid results in a power loss. Thus, as a rule it should be stopped or minimized. In other engine concepts, for various reasons, either one of the two approaches is used. For instance, in gas turbines, working fluid leaks around blade tips (compressor and turbine) are accepted out of necessity, but controlled. In internal combustion engines with piston, an attempt is made to stop or limit the amount of blow-by around the piston, using rings, and to maximize the degree by which combusted gas is replaced by fresh air in the combustion chamber after the preceding cycle. Both approaches may be applied to the construction of the vane engine of the present invention: eliminate the leaks or exploit and control such leaks.

Air or gas leaks naturally occur where two sliding surfaces, which should be friction-free, must also seal a passage between two volumes where the pressures of the two fluids are different. This condition exists: (1) along the three free edges of the vanes, (2) around the vane articulations, (3) between the side surfaces of the rotating body (central or external structure) and the separation flanges, and (4) at the interface between the seal and the surface sliding by. Items (1) and (2) are discussed first, and item (3) and (4) are discussed further on.

Without air cushion pad, the vane end free edge, if vane bouncing is ignored or is non-existent, remains in constant and full contact with its track: e.g. no leak occurs. With the use of air cushion pads, an unwanted leak is stopped by a controlled leak of high pressure air: e.g. again no working fluid leak occurs, at a calculated and acceptable energy cost. Because of the vane unidirectional curvature around an axis orthogonal to the planar surface against which the side edges of the vane must slide, it is practically impossible to provide an effective sliding seal for that inerface. One must either accept such side edge leaks and control their magnitudes or again stop them with a high pressure air cushion, as earlier discussed. If the effects of thermal differential expansion can be handled by means of construction design and/or choice of materials, the degree of such leakage can be controlled and rendered acceptable.

A curved vane, along the direction of its curvature, may be assimilated to a rigid structure, in terms of its behavior in the context of the present discussion. A mean clearance of 0.002–0.003 inch on each side of the vane, above and beyond any provision for thermal expansion, if any is contemplated, will suffice. The flow of air and gas through such narrow slots is small for the pressure differential levels of interest and well in the low subsonic range. Furthermore, at least in the case of rigid or semi-rigid vanes which have a substantial thickness, narrow grooves can be cut along the vane side edge for creating small expansion chambers having cross-sections shaped to offer added resistance to the leakage flow. Such a construction is also possible for flexible vanes consisting of at least three layers of springy materials that are enabled to slide against one another to add to the vane flexibility, whereby one layer width is slightly shorter than those of the adjacent layers, thus creating an expansion chamber of the type just described, when the layers are properly centered. The scraping action of the ridges forming such chambers along the flange surface could be seen as beneficial, or a cause of problems: i.e. (1) it eliminates the deposits of solid matters on the flanges, and (2) it will eventually fill these expansion chambers with solid residues that will alter and finally stop their effectiveness. Means available for minimizing the amounts of such deposits and/or eliminating the scraped matter are well known in the art of fuel composition, additives, etc. . . . , but this is beyond the scope of this discussion.

The leaks around the vane articulation are eliminated in two ways: (1) for flexible or semi-flexible vanes, by tightly locking the vane retaining end edge in the rotor, and (2) for rigid vanes, by using high pressure air to keep the articulation interstices unclogged and free of extraneous friction causes. There appears to be no other safe way to insure that a mobile articulation cannot freeze after long non-use periods during the engine lifetime.

The next important source of leaks or friction is the interface existing between the rotor and its separation flanges. Such interface was an important problem in the development of the Wankel Engine. Its lubrication is difficult. The use of a pressure loaded side plate, between rotor and flange body, to account for thermal expansion, limit friction and eliminate air/gas leaks can also be contemplated for the engine of the present invention. The added construction complexity is not warranted here. High pressure air cushions provide the sealing required or its control, eliminate the intrusion of unwanted matter in the interface and reduce friction to negligible levels.

Selection of Vane Type

Flexible vanes are lighter, most conformable, occupy smaller volumes and are thus more space efficient, and could be much less expensive. They deserve serious consideration. They cannot and need not be spring loaded as may be required in the case of some vane arrangements. The vane structure itself provides the spring function. Centrifugal forces either are of less importance or their use should not be contemplated. The magnitude of the spring forces that they can provide is limited, for they cannot be made very stiff. The vane material nature must be compatible with that of the material used for the external structure. In almost all instances, densified carbon/carbon, carbon/graphite or graphite/graphite materials could be used. They are strong, flexible and springy, stiff, temperature resistant and light. Their thermal expansion is low and they provide low friction with almost all other structural materials. They are currently still very expensive. Should their advantages listed above warrant their use, flexible vanes will be used, at least for the combusted gas expansion function, when a single function is expected of a vane.

If the use of flexible vanes does not seem advantageous, at least for application to one of the two functions, rigid or semirigid vanes can be constructed to insure satisfactory operating performance. Ceramics and some high temperature metals appear to be likely candidates as such materials. Considerations of thermal expansion will play an important role in a final choice between metals and ceramics. A thorough discussion of the relative merits and disadvantages thereof is beyond the scope of the present disclosure. Use of zero thermal-expansion ceramics for the rotor, the vanes and the external structure combined with the use of a graphite vane free end tip will diminish the usefulness of an air cuhion pad, provided that the rotor is air cushioned. In such case, semi-flexible vanes fixedly mounted onto the rotor will not require side air cushions. Rigid vanes may or may not depending upon the nature of the material used for the separation flanges.

If materials having some thermal expansion are used in the construction of these three basic engine components, side air cushions will be needed for both rigid vanes and rotor. However, again the use of graphite tips for the vane free edge may help eliminate the use of air cushion pads. The vane tip, its importance and behavior, air cushion pads and seal interference therewith need now be addressed.

The vane free end edge or tip plays three vital roles: (1) it must rest or ride along its full length (vane width) on the inner surface of the external structure (track) at all times, (2) it must become unobstructive when the vane passes by the seal(s) and not affect the seal operation effectiveness, and (3) it must perform the equivalent of a valving function when passing by the admission and/or exhaust ports. Ways and means for insuring that the vane tip edge will theoretically thusly perform have earlier been described and discussed. Practically, there remains some aspects of the static and dynamic behaviors of the vane tip edge that needs further discussing. These vary according to the type of vane and the manner in which it is mounted.

The vane tip edge must remain parallel with its swing axis, be it real (rigid vane with well guided articulation) or virtual (semi-rigid and flexible vanes with flexible articulation). In the case of the rigid vanes, care must be taken that: (1) the tolerances on centerline alignments of the articulation and of the track are within the amount of play permitted by the clearances allocated between the articulation outer surface and the inner surface of the open bore wall, and (2) the vane tip edge at any of its possible positions is contoured so as to assure a line contact with the track surface, again making use of the articulation clearances just mentioned. In the case of the semi-rigid and flexible vanes, the equivalent of the angular accommodation provided by the rigid articulation clearance can only be provided by some torsional flexing of the articulation. The flexibility of the articulation inherently required insures that such torsional flexing may take place at any time, but at the cost of displacing the vane free end laterally against the planar surface of either flange. Therefore, excess vane lateral play must be provided or unwanted vane side friction will occur and the vane tip edge will not automatically squarely rest on its track. Flexible vanes may accommodate such misalignment but semi-rigid vanes will not and such condition must be prevented from arising.

Because flexible and semi-rigid vanes are fixedly mounted on the rotor (assuming a central rotating body) and because the side faces of the rotating assembly of rotor and mounted vanes are located in two parallel planes, such assembly side faces can be ground and lapped with the vanes rigidly held in their two extreme operating positions: fully deployed and folded back. Such fabrication precaution will insure that the vane side faces can never be prompted to reach beyond the flange surfaces and exert sizable loads thereon, at any vane intermediate position between those two extreme positions.

When passing by the admission ports of the expansion chamber in particular, because of the shape which must be given to these port openings (FIG. 10), the corners of the free portion of a flexible vane may be solicited to bend. Such local bending could easily occur because this end portion of the vane remains quasi straight when the vane is deployed, except for any bending which may result from the pressure differential existing across the vane. This condition may be remedied by stiffening the vane free edge along its length as shown in FIG. 19. However, such construction is not easily adaptable to carbon-graphite vanes. An alternate preferred construction is illustrated in dotted lines in FIG. 5 as an example. The inner surface a of the inner layer of vane 49 is equipped with a ridge b consisting also of carbon and made integral part of that layer. The ridge thickness provides the local edge stiffness required. Impregnating the ridge volume with tungsten or such heavy element could also be substantially increase the ridge mass, thus providing the weight needed for centrifugal force boosting, applied underneath the vane tip. When vane 49 is folded, ridge b fits inside lodging c cut into surface d of the rotor, so as to be out of the way when the vane free end passes by seal 59 earlier mentioned. At this point, it may be appropriate to discuss the lock construction located at the vane other end as it also pertains to the vane fabrication.

Carbon and/or graphite matrix materials reinforced with carbon and/or graphite fibers are very strong in the direction in which those fibers are laid up. Such is not the case in any other direction, especially for tension loading modes. Also, the modulus of elasticity of these fibers is very high but their stress/strain curve presents no possibility of plastically deforming either the fibers or the fiber-matrix composite. Molding bodies having specified shapes and sharp section changes is not practical either, because the composite material cannot be given uniform strength in all directions. This type of material is best fabricated to have its optimum characteristics when pressure can be applied perpendicularly to the fibers at the same time tension is applied to the fibers. Such conditions can be realized when flat sheets of the material are fabricated. The fibers in various stacked layers may be laid at an angle so that strength is obtained in orthogonal directions. However, producing a bead-shaped roots such as that which was previously described (45–46 of FIG. 5) would be practically unrealistic. A more preferable root shape is that which is also shown in dotted lines where e represents the outline of the vane root housing in the rotor and the inverted wedge-shaped body h represents the vane root. No excessive bending, and always well determined and supported, of the locked end of the vane is ever required during operation. The reinforcing fibers fan out in body h from point t to the thick end of the wedge so that fiber structural continuity is maintained all the way to their ends. The wedge shape is obtained by increasing the amount of matrix between fibers and by adding short fiber segments between the layers of continuous fibers. At a point such as k where vane bending is needed from then on, the layers which form the unrestrained vane body must be free to slide radially with respect to one another so as to enable the vanes to assume the rotor shape when folded on surface d. Therefore, from point k to the vane tip edge, the thin layers that form the vane thickness remain unbonded to one another and free to slide. The proper relative dimensioning of layer thickness and radius of curvature R' determines the spring force that the vane exerts in direction f at its tip, and which varies according to the length x-y between point X where the vane contacts the rotor and tip y where the vane tip rests on its track. It seems that the reinforcing fibers should be laid so that they all make a 45° angle with either the free end edge or the side edges of the vane. Only those fiber segments laid between layers for building up the wedge thickness should be oriented parallel to the vane edges so as not to interfere spatially with the ends of the reinforcing fibers.

Should carbon/graphite vanes so fabricated be used in a dual function capacity where the vanes must operate half of the time resisting the pressure differential, the increasing bending moment required to bend the vane free portion happens to vary in magnitude as the pressure differential itself augments, i.e.: (1) augmenting when dimension δ increases (lower pressures), and (2) reducing when δ decreases (higher pressures). Such vanes appear to be best qualified for application to the motor depicted in FIG. 13. The presence of seal 59 and the possibility of interference between vane free edge and seal edges must not be examined in the case where the vane free edge first approaches the seal.

The seal constructions of FIGS. 14 and 26 can be used for illustrating the problem and its solution. The seal consists of a bar extending between the separation flanges and having one face attempting to protrude outside its housing. This face is prevented from ever coming entirely out because it always makes contact with a part of the rotor and/or the outer surface of a vane as was earlier described. For rigid and semi-rigid thick vanes, the potential interference problem does not exist because of the shape that can be given to the vane tip. For flexible vanes such as that of FIG. 5 just discussed, when edge 48 reaches the rim of the seal housing (vane moving in the direction of arrow f'), the rather sharp edges of the vane layers will catch the seal edge, because of the vane stiffness which causes any unrestrained vane portion to try deploying outwardly. This condition can easily be remedied by chamfering the edge 3' (FIG. 14) or 3'' (FIG. 26) of the bar sealing face.

In such instances, the force exerted by the seal on the vane tip must be sufficient to keep it against the rotor outer surface and prevent it from sticking out. In order to further insure that no interference is possible when the vane tip stops contact with the seal and reaches the other side of the seal housing, a second chamfer ($e_1'$ in FIG. 26 and $e_1''$ in FIG. 14) is provided as shown. Relative dimensioning of the vane layer thicknesses, of the seal bar width and of the chamfers will insure that such interference cannot ever happen. These chamfers make small angles relative to the sealing face so as to ease the sliding by of the vane tip edge and to minimize the bouncing of the most outerly located layers of the vane.

If carbon/graphite vanes are used, the seal material could also be carbon/graphite, but fabricated differently and in such a way that most of the reinforcing fibers are laid in a radial plane and oriented at an angle with respect to the seal contact face. Fiber orientations perpendicular or parallel to that face are to be avoided. One must constantly bear in mind that the seal is an elongated bar which also needs strength in two other orthogonal directions. Such reinforcement may be provided by laying some fibers in a direction perpendicular to the surface against which the seal rests and slides (e.g. surface 124 of FIG. 14). Seal bouncing must also be prevented whenever such vanes are used because the passage of each vane tip edge generates an impulse, however small, which entices the seal to "jump" or attempt to.

Every time one vane tip edge passes by the seal, the reaction of that edge on the sealing face increases slightly. If such increase in the vane deployment load is also fully balanced by the pressure and spring forces acting on the seal in the opposite direction, the seal body does not move and no "jumping" occurs. In such instance, the sealing face never breaks contact with the outer surface of the vane and the vane tip is not given any opportunity later to interfere with edge $e_1'$ or $e_1''$, as the case may be. However, if the stiffness of the vane is too high and/or the force exerted by the seal is not large enough, the seal body will respond to such impulse and move away (jump). That action per se would be acceptable if happening only once in a while. However, at some rotor speeds, the frequency at which a vane tip edge passes by could correspond to the response frequency of the vibrating system formed by the seal mass and its back-up spring.

The exciting frequency in cps of the vanes is n.N/60 if n is the number of vanes and N is the rotor rpm. n is fixed for a given rotor/vane assembly, but N may easily vary in a ratio of 30–50 to 1. It is not practical to expect a match of mass and spring stiffness to be either low enough or high enough so as to adjust the seal frequency to fall well outside such a range. Therefore, it is more practical to alter the response type of the seal in a manner such that the seal mass is mostly solicited by a constant and adjustable force, i.e. an adjustable fluid pressure applied on the back side of the seal. Such pressure loads can be made to far exceed the spring loads in magnitude and to be variable by means of a pneumatic potentiometer such as that shown in FIG. 32. The air pressure can be increased in those rotor speed ranges that could generate impulses at frequencies close to or multiple of that of the seal mass-and-spring system.

Both seal configurations make use of friction bead seals located on the side of the seal bar. This solid friction will have a dampening effect on any vibrating motion of the seal body, but can never be relied upon as a sole safe solution, because solid friction varies in magnitude with time and is affected by many other imponderable factors: wear, foreign matter deposits, etc . . . .

A proper combination of the two solutions, however, will insure that the seal mass cannot enter into a resonant vibrating condition at any and all rotor speeds. The most important feature of such combination is the possibility offered by the pressure adjustment construction to control loads on the sealing face.

Air Cushion Pads

The use of high pressure air in air bearings and/or thrust pads was discussed earlier in general and as it applies to the common shaft, the rotor and/or the vane centerings. The use of an air cushion pad located at the tip of rigid or semi-rigid vanes was also discussed. The behavior of such air pads under various operational conditions and supplying air to semi-rigid vanes remain to be discussed. It is understood that air cushion pads are not needed when carbon/graphite vanes are used, or it is at least so assumed. These points will now be addressed.

The particular case of semi-rigid vanes is treated first. Because these vanes are fixedly attached to the rotor and not free to move laterally, centering of the vanes with air cushions is unnecessary, as earlier mentioned. The problem still is to bring high pressure air to the vane tip edge from the only accessible source located in the rotor body. The channelling of this air is described in a previous section as represented in FIGS. 42 and 43. Three features thereof need further discussion: (1) the connecting of the ducts in the rotor to ducts in the vane flexible articulation, (2) the behavior and operation of the flexible air ducts affixed to the flexible articulation, and (3) the ducting of this air through the vane body to its tip edge.

Again it should be emphasized that minimal air leads are of no consequence, as long as the leakage flow rate does not affect the pad operation. The flexible hinge is locked in the rotor along the whole width of both vanes and rotor. The vanes receive no lateral solicitation and such locking can be made reliable for the life of the engine. Such locking extends to a rigid collector box which is made part of the vane flexible hinge and which is prevented from moving in any direction. This box thus occupies a position well defined and fixed with respect to the rotor. Making the air transfer holes in the air-receiving wall of the box larger than matching holes 323 in the rotor insures that misalignments due to tolerances do not affect the hole matching.

It seems impractical to attempt to seal the interface between the two in-contact surfaces of the walls that house the connecting holes. Collector box 322 can be made rigid enough and machined so as to enable its handling as a fitted part and its pressing into its lodging along with bead 46'. The clearance between the two facing walls can thus be reduced to zero. The air pressure in the box is always much higher than the pressure existing outside the box, be it of compressed air or of combusted gas.

As illustrated in FIG. 43, flat cross-section tubes affixed on one side to the flexible articulation structure connect the collector box to ducts located inside the rigid portion of the vane body. The opposite side of these flat tubes is not supported except when the vane is forced to fold back from its fully deployed position. As the vane folds and as the articulation structure bends, this free side makes contact with the outer surface of 327 and becomes supported. That tube side is slightly pushed inward and causes the tube to flatten further slightly, as does the Bourdon tube of a pressure gauge, but for a different reason. The external support so provided and the flattening action just mentioned cooperate to prevent local buckling of this tube wall. The presence of the tubes adds somewhat to the stiffness of the articulation. This effect can be accounted for in the part design. When the vane is fully folded, the vane underface 38' fits in recess 84 and matches its contour.

Flat tubes 324 connect to the vane body referred to as box 325. The high pressure air does not fill that box cavity, because it is not built to withstand such high pressures. Not shown in FIG. 42 are tubes affixed to and located between the vane two walls, inner and outer, forming fthe equivalent of a double skin structure equipped with internal stiffeners. The tubes or ducts are cylindrical, fewer in number and have a cross-section larger than that of flat tubes 324. These cylindrical tubes extend the length of the vane and connect with a manifold duct located at and along the vane free end. This manifold duct is then connected to distribution ducts 272 by intermediary ducts 273 as is illustrated in FIG. 38 and was previously described. The mounting and construction of the air cushion pad are the same as was also described in the previous section.

The construction, operation and behavior of the air cushion pads are the same whether the pad equips a rigid vane or a semi-rigid vane. From this point on, it will be assumed that the type of the vane is immaterial. Only one remark needs be made here: the force with which the vane pushes the pad against its track surface may be greater with semi-rigid vanes because of the moment exerted by the articulation on the vane, especially when in or near their folded positions. This effect may be translated into a smaller separation distance from the track surface and/or a larger size given to the unshown fixed size restricting orifice.

Although not clearly shown in FIG. 38, lips 296 and 298 of the pad are slightly bent inwardly so as to insure that the contact lines of the pad with the track surface always remain close to the reference points 0 and 0'. This is to ascertain that the effective pad support area does not vary appreciably as the curvature of the track surface changes. The other beneficial side result is that the lip edges do not act as scrapers, thus preventing the accumulation of unwanted matter inside the pad. Also, as described in the previous section, the "top" of retaining structure 278 is located below line 0-0' to an extent such that even where the track curvature reverses itself to its maximum degree, this top never makes contact with the track surface. Also, to insure that at rest the pad tends to assume the position that results in points 0 and 0' being equally distant from the surface of the track, the pad articulation axis is located as close as physically possible to the track.

The object of the air cushion pad is to eliminate friction between the vane and the external structure. This is not entirely possible because the pad structure is free to oscillate about axis 270 whenever it is solicited to do so. During such oscillations, contact with the track may happen momentarily at points 0 or 0', without disturbing the overall size of the variable size restricting orifice formed between the pad lip knees (points 0 and 0') and the track surface. The effective size of this orifice is the sum of these two areas: the width W of the vane times the distance h (or h') between 0 (or 0' as applicable) and the track surface, or W (h+h'). If ideally balanced and at rest, the pad should assume a position such that h=h' and the effective area of the variable size orifice is A'=2hW. Such would be the case if the center of pressure were positioned "under" the center of of rotation of the pad in FIG. 38. That is unfortunately not possible because of the reverse curvatures that the pad must contend with. Therefore the air cushion pad, as shown, is not self stabilizing and a knee will most of the time drag on the track.

Let's now examine the effects of such dragging and discuss means and ways to minimize or to eliminate it. First it must be understood that the force exerted on the track by a pad lip contact is much smaller than the force that the same vane would exert otherwise at that contact point on the track, were it not for the presence of the pad. Thus a first approach is to accept the amount of much reduced friction therefrom. Another aproach is to alter the basic pad construction configuration of FIG. 38. This is possible in two ways: (1) by changing the shape of the lips, and (2) by splitting the pad into two halves laid out in parallel. These construction changes are discussed below in the order shown above.

If the lip knees (points 0 and 0') form sharp angles and the lip outer surfaces are flat, points 0 and 0' (points on the lips closest to the track surface) keep the same position, regardless of the degree of tilt of the pad. The reasoning presented earlier stands and the pad is not self stabilizing. However, if points 0 and 0' are permitted to move back and forth along the lips, the resultant of the pressure forces exerted on the pad structure also moves accordingly from one side of the pad rotation axis to the other side, back and forth depending upon the tilt direction. Enabling points 0 and 0' to so move can be achieved by convexly curving the outer surface of the lips and rounding the knees. The lip shaping then results in a condition such that the location of the point closest to the track surface moves as the lip opens or closes the gap between the lip and the track, as follows: the closer the lip comes to the track, the farther out point 0 (or 0') moves, and vice versa; for a given nominal value of (h+h'). As this happens, the air escapes through the wider gap at a higher velocity (lower degree of influence of boundary layers) and the static air pressure applied on the wider-gap lip decreases. The end results are a pressure applied on a larger area of the one pad half and consequently a force exerted against that pad half larger than the force exerted against the other half. Closing up one side of the pad gap thus creates an aerodynamic reaction increase opposed to such closing, which provides the negative feedback required for self stabilizing the pad oscillatory (tilting) movement.

The second approach is to divide the pad structure into two parallel and identical sections, each section constituting a pad of its own and located on each side of tilting axle 270. Each sectional pad acts in opposition to each other, thereby operating in a fashion similar to that of the air cushions used for centering the vanes an/or the rotor. This type of construction and its operation were described and discussed at length previously and need no further discussion. In this approach, the restricting orifices, the high pressure air ducting, the pad structure, etc . . . are arranged so as to obtain the same effective pressure area on the track surface, within the same overall pad volme, as is represented in FIG. 38. The lips can be shorter, need not be curved and are shaped to prevent scraping and accommodate reversed curvatures of the track. It is assumed from now on for the purpose of this discussion that: (1) the air cushion pad is self stabilizing, (2) the area on which the air cushion pressure is applied is constant regardless of how self-stabilization is achieved, (3) no cross-coupling exists between the pad tilting motion and the value of $(h+h')$, (4) the pad tilting motion is limited only by contacts made with the track, and (5) the pad dynamic behavior is unaffected by the degree and/or direction of the track surface curvature and/or the angular position assumed by the pad relatively to the vane orientation. The following discussion pertains to the last two aspects to be considered regarding the pad dynamic operation and interaction with seal 59.

It was earlier mentioned that the magnitude of the forces acting on a vane vary substantially as a function of the following vane operation parameters: (1) the rotational speed of the vane/rotor assembly, (2) the degree of deployment of the vane (angle V and pressure differential across the vane), (3) the type of articulation that connects the vane to the rotor, and (4) the manner in which the vane is oriented (pressure differential direction). As far as the pad is concerned, with the assumptions made in the above paragraph, its behavior is limited to two basic movements: (1) oscillating about axle 270, and (2) varying the average distance between the lips and the track surface. The amplitude of the oscillating motion is limited by average distance $h^*$ which is equal to $(h+h')$. $h^*$ is dictated by the force exerted on the vane tip edge and will vary to adjust the effective area of this equivalent of a variable size orifice so as to adjust pressure $P_i$ of FIGS. 31 and 32, so as to generate the reaction against the track needed to balance the vane tip force. Assuming that the air is supplied at constant high pressure to the fixed size orifice located downstream of the pad, the magnitude of $P_i$ may vary considerably and so must $h^*$, possibly in a ratio of 3/1 or even more. It should be mentioned here that in general $h^*$ is larger when angle V is larger (smaller values of $P_i$), and vice-versa, so that the variations of $h^*$ relatively to the values of D and/or d are of much lesser comparative magnitude.

During the air compression travel or the gas expansion travel, the pad is not solicited to change its orientation with respect to the vane, but must make up for those vane orientation changes. This requires a rotation of the pad with respect to a fixed set of coordinates. However, that angular motion is slow and gradual and should not trigger any oscillatory pad movement. The conditions are quite different in those portions of the vane rotational travel where the pad orientation must rapidly be adjusted to follow the rapid changes in curvature of the track surface and also immediately after the pad ceases any contact with the seal. In both instances, other extraneous influences come into play: i.e. (1) the openings of air admission port or of the gas exhaust port, and (2) the openings of the combusted gas admission port. The influence of the compressed air exhaust port openings may be ignored because the pad comes immediately after in contact with the seal, which will stop instantly any pad oscillatory motion.

It should be stated here that $P_i$ will reach a very low level when the pad faces the openings of either the air admission port or the gas exhaust port. $h^*$ may then become nil and the pad lips may both contact the track. No pad oscillation is possible then. The loss of high pressure air is then limited by the fixed size restricting orifice. However, when the pad encounters the combusted gas admission port openings, it has just left seal 59 and it has become free to oscillate. As the pad reaches the ends of the port eyelid-shaped slots, the pad is given an angular impulse, because of the abrupt equalizing of the pressure loads applied on the lips. Though this occurs when the pad must move away from the track surface and when the pad begins its uneventful travel along the combusted gas expansion portion of the track. Whatever oscillatory motion which may have been induced earlier has ample time to be dampened out. The above pertained to a pad mounted on a vane which tends to deploy under the solicitation of the pressure differential.

It is safe to say that only semi-rigid vanes or rigid vanes equipped with torsional springs can be used if the vanes are affixed otherwise (pressure differential tending to fold back the vane). In such cases, the torque exerted on the vane generates a force which acts similarly to the way the pressure differential acted in the cases discussed in the previous paragraph. In general, the solicitations applied to the pad and its behaviour are not in principle that different from those just discussed. However, if both the compression and the expansion functions are performed by the same vane/rotor assembly (case of FIG. 13), which means that the vanes and their pads must operate according to one of the two possible ways of pressure loading vanes during either functions, or half of the time. The extent of load variations which the pad operation must then cover becomes so large that it appears unrealistic to envisage the use of air cushion pads in engine configurations that demand a dual type of operation of the vanes. An more elaborate discussion of this possiblity is beyond the scope of the present disclosure.

The interaction with seal 59 may now be discussed. When air cushion pads are used, it is now assumed that vane/rotor assemblies can only perform one function. In the case of the air compression function, the vane tip edge and pad approach the seal first. Then the vane body (outer surface) engages the seal. In the case of the combustion gas expansion function, the vane articulation is first to approach the seal. In both cases, the pressure differential is high across the seal, for on one side is either compressed air or combusted gas at their highest pressure levels for that stage, and the other side is vented to either atmospheric pressure or the lowest pressure levels for that stage. As shown in FIG. 38, when the vane is folded back, the pad lips are forced to remain at or below the surface defined by the outer cylindrical surface of the vane. In the case of the compression function, the pad approaches the seal face in a position in which the engaging lip is retracted. A small chamfer on the edge of the seal as previously discussed, combined with the use of a rounded knee will avoid interference at that point in time.

Once the pad lip first engaged is under the seal face, the pad is forced to remain in its approach position. The pad other lip then presents itself in front of the seal chamfer. Again it is positioned slightly below the seal face and no interference seems likely at that time, either. The outer surface of the vane body in turn comes into contact with the seal face. The vane is forced to remain folded by the seal action until the vane articulation ceases to be restrained by the seal face, at which time the vane has become free to unfold and to deploy within the physical limitation of the constraint imposed by the track surface. Momentarily, the pad may "free-tilt" freely because it can make pneumatic contact with the track only after the vane is able to deploy up to the extent where the vane tip edge meets the track surface. This condition is inherent to all rigid vanes and must be coped with, regardless of the vane tip construction. The most practical accommodating approach should now be discussed.

At this juncture, it might be useful to consider first the behavior of any rigid or semi-rigid vanes as they emerge tip edge first from under the seal. They are forced to remain in their folded position until the articulation is entirely freed. Then it is desirable, for space saving reasons, to have the vane swing to its fully deployed position as soon as possible thereafter. Whether or not the vane is equipped with a pad, it is also desirable to prevent the vane tip edge from hitting the track surface. This can be achieved by causing the vane outer surface to contact the track surface at all points simultaneously. This can be assured by shaping the track contour to have the shape (cylindrical portion) of the outer surface of the vanes, starting at the junction of the track with seal trailing edge. This applies to compression function vanes particularly. The case of expansion function vanes is discussed later.

If the vane tip edge is equipped with an air cushion pad, the pad structure thus remains unconstrained from the time the pad fully leaves the sealing face of the seal to the time when the vane becomes fully deployed. The pad lip knee corresponding to point $0'$ of FIG. 38 could at such contact time occupy the relative position shown in phantom lines. This pad knee would then make contact with the track surface in an undesirable manner. A situation of this type may easily be avoided by using a bending leaf spring S (shown in phantom lines) affixed to end structure T of the vane body. The force exerted by such spring is of a magnitude much smaller than the pneumatic forces exerted by the pad as earlier discussed. Its role is only to force and maintain the pad in a "retracted" non-interfering position, i.e. that which is shown in solid lines in FIG. 38.

The construction just described thus insures that: (1) the contact of the track by the vane is smooth, and (2) no portion of the pad hits the track surface. In such instance, the pad is not solicited to start oscillating because it faces the openings of the air admission port and pressure $P_i$ cannot build up. The use of spring S has another advantage: that of helping damp out any tilting oscillation of the pad which could otherwise be induced.

Expansion function vanes must operate in reverse, i.e. fold as rapidly as possible when the articulation of a rigid or semi-rigid vane contacts seal 59. Again it is desirable to cause such vane folding to be quick but gradually performed. This requires loads to be applied on the outer surface of the vanes which are much larger than is reasonable to expect of the seal action. It is more practical to enable the track surface and external structure to perform such function. This can be easily done by shaping the track contour in region R (FIG. 12) of the track, just before vane 56' articulation reaches seal 59 leading edge. The curvature of portion R of the track contour and the partial cylinder shape of the outer surface of the vane cooperate to impose a gradual folding of vane 56' once its tip edge has passed edge R' of exhaust port 66'. The length of portion R of the track can be reduced to the maximum extent that will cause unacceptable loads on the vane. For a given radius of curvature of the outer surface of the vane and a vane length, a well defined curvature of track portion R can be determined so as to prevent high accelerations and high vane folding velocities at the time the vane makes contact with the rotor.

When such contact has been made, the vane articulation engages seal 59 while the air cushion pad is kept in its retracted position by spring S. Pressure $P_i$ is practically nil then and will not recover until the pad reaches the seal. Pad lip knee $0'$ is then located at or slightly below the vane outer surface circular level and cannot make contact with seal 59 leading edge. The wording "leading" and "trailing" is used to refer to those edges of the seal which first make contact with a passing vane. The pad is thus never subjected to tilting solicitation or shock during this phase of the vane circular travel.

It is possible to envisage the use of semi-rigid vanes in the engine construction of FIG. 20 in which the vanes are mounted on the external structure, the central body rotates and channels both the air and the combusted gas. The vanes could also be equipped with air cushion pads in that case. That appears less feasible if rigid vanes are used and a torsional spring is needed. In the case of semi-rigid vanes, the spring action is provided by the vane, a torsional spring is not required and ducting high pressure air in is then possible. In such vane construction, the pad is mounted on the inner surface of the vane and is pushed onto the outer surface of the rotor which becomes then the track surface. The seals are mounted in the rotor and the type of operation analysis previously carried out for rotating vanes is left to the reader to make. Provisions can also be made in the rotor track curvature and the seal edge design for preventing shock loading and inducement of pad tilting oscillations.

The use of an air cushion pad offers an advantage which is worth mentioning now, as especially applicable to engine configurations utilizing single function or purpose vanes, that which disposes of the seal altogether. If the vane length is slightly shorter than the portion of the track which is configured to be adjacent to the surface onto which the vanes are mounted, a pad will always be located somewhere in that track portion. The air escaping from the pad around the lips thus provides a barrier to compressed air or more particularly combusted gas which would be urged to flow toward the lower pressure region of the air admission or the gas exhaust. That point is relatively unimportant in the case of compressed air, it would represent a loss of magnitude much lesser than the air loss generated by the air pad. However, in the case of the combusted gas, the jetting action of hot gases between the track surface and the vane outer surface could be damaging and may require prevention. But $P_i$ is always higher than the highest combusted gas pressure when the pad is operating, which it always will be when located in that region. High pressure air escaping around the pad lips will prevent combusted gas from flowing by. Thus a seal is not required, the penalty being a extension of the "dead" volume discussed before.

If the vanes perform both functions, the seals are located between either two low pressure spaces or two high pressure volumes. However, in such instance, the relative amount of "dead" volume is much more important. The discussion of the advantages and disadvantages presented by either configuration, i.e. seal compared to no-seal, is beyond the scope of the present discussion, but should be noted. The engine application will have much to do with a design decision in either direction. Other considerations, such as that which is discussed next, come into play.

Leakage Around the Vane Sides

Except for engine configurations in which rigid vanes are centered by means of air cushions on the vane sides, air or gas is allowed to flow around the vane sides. It is unrealistic to envisage the use of any type of squeezable friction seal in such location. The use of "dynamic" seals was previously discussed, whereby the effective amount of clearance can be reduced. Full physical closing of the clearance gap is not achievable and some leakage is to be accepted. The issue is reduced then to: (1) assessing the leakage importance, (2) what can be done to minimize that leakage, and (3) how the engine performance will be affected, either way.

Leakage of partially compressed air and of partially expanded combusted gas represents an energy loss, always. In addition, leakage of combusted gas in the high pressure region of the expansion, where the gas temperatures are the highest, could be mechanically damaging because of the jetting effects of hot gases on the walls containing such jets, wear being the end result. Gas velocities in such jets are the culprits. The beneficial action of a dynamic seal resides mainly in the ability of such seal to reduce these velocities. Another approach is to decrease the ratio of the pressures applied on each face of the vane. That pressure ratio strongly influences the peak velocity reached by such jets. As was previously mentioned, the lower the stage pressure ratio and the larger the number of vanes per stage, the lower is the interstage pressure ratio, i.e. across the vane. For a given engine application, size and weight limitations, type of fuel to be burned, and maximum engine rotational speed, the engine configuration and construction are well determined and to the extent where little could be done regarding single vs dual function selection, number of vanes and/or interstage pressure ratios. It is assumed however that in all instances, an attempt should be made to minimize the leakage of combusted gas. This means that this applies to all dual-function vanes and to single-function vanes that operate in combusted gas expansion chambers.

The two practical vane constructions which seem most attractive are: (1) the flexible carbon/graphite multi-layered vanes, and (2) the semi-rigid vanes (with or without air pads). The following regarding semi-rigid vanes may also apply to rigid vanes which do not make use of side air cushions. These two main types of vanes are now discussed separately. Carbon/graphite layers of flexible vanes are reinforced with fibers that are laid at right angle between themselves, and at a preferred 45° angle with respect to any edge line of the vane. During the vane fabrication process, a short portion at the end of the fibers is left unbound and free, in a brush-like fashion, on the vane side edges. When assembled, the various unbound layers of the vane flexible body form a narrow band of short flexible fiber stubbles oriented at 45° with respect to one another in adjacent layers. The width of the bound fiber layers is slightly smaller than the distance between two contiguous flanges. The total width of the vane (bound fiber region-+unbound fiber margin) is slightly larger than the distance just defined. When the vanes are installed on the rotor and the assembly is placed between two flanges separated by the external structure, the free fiber stubbles bend to adapt to the space limitation thus imposed. The bent stubbles fill the clearance gap created between the edges of the unidirectionally rigid portion of the vane body and the flange surfaces. These stubbles crisscross at a 90° angle approximately and form a springy thin elongated brush-type mat which tends to center the vane between the two flanges. The resulting sealing action is not efficient, but the mat reduces considerably the velocity of the by-passing gas. This amount of by-passed combusted gas is negligible and its jetting action is eliminated. This method of partially sealing the vane side gaps can be applied to rigid and semi-rigid vane constructions, when not equipped with air cushions.

A narrow thin band of the material just described including the mat and a narrow portion of the bound fiber layers formed to fit inside a holding groove located along the side of a rigid vane can be secured to the rigid vane body structure, with the mat fibers jutting outwardly. The vane and pliable seal assembly can be installed between the flanges as previously discussed, thereby providing the same type of sealing action. In such case, the mat does not have to bend lengthwise and the bound fiber portion may be made rigid and thicker. In all instances, the seal stubbles are solicited to bend in the two major directions in which the vane moves: i.e. circular motion and swinging motion. The circular motion is unidirectional but the swinging motion is bidirectional. Also, vane side edge velocities caused by the circular motion are several times larger than those caused by the swinging motion. At the point where the stubbles emerge from the solid portion of the seal, they form a 45° angle with the flange surface, half of them in one direction and the other half in an opposite direction. The combination of all these factors results in none of such complying stubbles having to bend back and forth in response to the "slow" changes of direction of the vane swinging motion. Each stubble, supported by some of its neighbors that make a 90° angle with it, merely needs reorient itself by making a 90° angle sideway sweep. Fatigue-type of failures of the free fibers can thus be practically eliminated.

It was mentioned earlier that the use of squeezable friction seals between the vane side edges and the flanges should not be considered. This is true for seals that offer little compliance such as O-rings. However, when the seal function is only to limit the amount of leakage by slowing down the leaking gas, the seal structure can be constructed in a manner such that friction is minimal, the seal degree of compliance is high, the seal action is independent of the seal motion and the pressure differential across the seal contributes to the seal effectiveness. The construction of both rigid and semi-rigid vanes, if side air cushions are not used, provides for space along the vane side edges which can be used to house such a seal. In FIGS. 34 and 35, for instance, spaces 250 are available to that effect. Such seals have a cross-sectoion forming a U-shape. One branch of the U is laid flat against and affixed to the bottom of volume 250, the other branch rests on the flange surface. Lengthwise, the seal is shaped to follow the vane curvature. The seal material is a springy high temperature metal alloy. The seal structure consists of several layers of thin foils of that metal. These layers are bonded along the U-branch which is affixed onto the vane and the remaining portion of the layers forming the U-section are free to slide against one another, as required for seal compliance.

Narrow short slots are cut from the free edge of the U-section at short intervals through the bend part of the U to the point where the other straight branch begins. The slots in adjacent layers of the U free branch are positioned in a manner which prevents two slots in two adjacent layers from being in line. These slots enable the free portion of the U-section to have great flexibility without generating high stresses in the seal material. The free branch of the U-section slides on the flange surface as the vanes sweep by. The pressure differential across the vane is applied so as to cause the U-section to open, thus contributing to the sealing action. The side forces exerted by such seal are small, which generates low friction, and should not be relied on to provide restoring forces of a magnitude similar to that which the air cushions might. However, if the vanes are properly mounted on the rotor, only small lateral forces are exerted on the vanes. The only leakage is through the interstices between slots and seal layers, and around the ends of the seal near the free end edge and the mounted edge of the vane. The use of such seal allows an increase in the amount of clearance that must be provided between vane sides and flanges without leakage penalty. The orientation and configuration of the seal free U-branch can be arranged so as to minimize the detrimental scraping effect which the edge of this free branch might otherwise exhibit.

Sealing means have been described for reducing the leakage to a level that is certainly acceptabble for a very small penalty for all types of vanes. These seal constructions are feasible and workable only because the vane engine of the present invention does not require lubrication. It should also be understood that some of these seal constructions may not be compatible with the kinds of fuels that produce soot and/or certain condensible volatile fractions in the combusted gas. Soot combined with condensed volatiles will form gummy deposits which will tend to clog the filtering passages present in either type of seals. In such instances, air cushions seem to be the only viable answer. Minimizing the gas and/or air leakages down to negligible levels disposes of the issue of engine performance penalty. That issue remains if air cushions are used.

One parallel can be drawn with gas turbines in which sealing the gap between the blade tips and the enveloping structure, for both compressor and turbine, is of course unthinkable. A conformable vane engine operates in a fashion similar to that of gas turbines, with the exception that it works on the basis of volumetric displacement, like a piston engine, instead of accelerating air and extracting momentum from high velocity gases. But it shares that similarity of requiring passages for air and gas between moving parts and fixed enveloping structures. In piston engines, such passages are much longer, lubrication is used and partial sealing is attempted with expandable rings. Because sliding friction of the vanes against guiding surfaces, as is present in sliding-vane rotary engine, is eliminated with the construction of the present invention, the similarity with gas turbines is even more striking. For that reason, a parallel comparison is carried with gas turbines to discuss the influence of the leaks of air and/or gas around the vanes.

In gas turbine and Diesel engines, the fuel/air mixture is always lean, in other words, extra air is present in addition to that which is required to sustain the fuel combustion. That extra air is mixed upon combustion with the primary combustion gases which become diluted by adding compressed air. In gas turbines particularly, the extra air or secondary air is used extensively for isolating the very hot primary combustion gases from any and all surrounding structures, or to cool them. The same process occurs in Diesel engines, but inside the cylinder. The same process takes place and is used in the external combustion engine described in the references cited at the beginning of this disclosure. Fuel is burned slowly in the free piston combustion member shown in FIG. 1, in which secondary air is used to dilute the primary combustion gases. The ratio between primary and secondary air is adjusted to maximize the combustion efficiency and minimize the production of pollutants, especially $NO_x$ (nitrous oxide mix). To that effect, the combustion temperatures are kept as low as possible by burning lean mixtures to begin with. Thus excess air is always present, available and/or used in the basic operation of this type of external combustion engine. Some of the secondary compressed air used in the combustion member can easily be saved for use in the motor part of the engine, especially in the combusted gas expansion chamber where it is beneficially needed. That is not the case in the air compression chamber where the introduction of such compressed air always represents a loss, primarily because compressed air requires further compression to higher levels, which results in a net energy loss. Vane side sealing should therefore always be attempted for vanes that have the single function of compressing air, where seal clogging risks and operating temperatures are both low. This represents a departure from the gas turbine similarity previously mentioned. The only relevant issue left is that of the single-function gas expansion vanes. How much energy is lost if no vane side seals are used?

It is impossible to evaluate this directly, but the gas leakage conditions can be compared to those of a gas turbine because the ratio between clearance and vane width is similar to or smaller than the ratio of blade tip clearance to blade length of an axial flow turbine. The pressure ratio across one blade-stage is similar in magnitude to that which exists across a vane. Thus the ratio of energy lost through gas by-pass to the energy generated by the blades is close to that which corresponds to unsealed vanes in the gas expansion chamber. That energy loss ratio is only a few percent of the energy generated by the gas turbine and should also remain of that order for the present vane engine operating with unsealed gas expansion vanes. It remains questionable whether the extra complication of sealing vane sides is warranted by such a small benefit. Only extensive design work and testing could answer such question. It has however been demonstrated that, should such sealing by justifiable, seal constructions may be designed to that effect. In conclusion, it appears that gas leaks around the vane sides cause no substantial or objectionable engine performance loss.

Bearings and Shaft Support/Coupling

In its simplest and most straightforward form, the motor portion of the vane engine–i.e. the assembly of air compression, combusted gas expansion and shaft power extraction members–consists of stacked up sub-assemblies, each comprising a central body, an external structure and a set of comformable vanes therebetween. These sub-assemblies are contained between sandwiching structural flanges and connected by a common shaft which extends through and beyond the first and last flanges. A schematic illustrates such a basic and simple arrangement in FIG. 11. This motor construction can also operate in a manner by which shaft 58 is fixed and mounted onto a fixed external structural frame and the flanges 126-128 and external structures 57 rotate. Regardless of which assembly is fixed and which rotates, the role and basic operation of the bearings connecting the flanges and the common shaft are substantially the same. The following discussion thus substantially applies to either case. For simplicity sake, it is thereafter assumed that common shaft 58 rotates and that the sub-assembly of flanges and external structures is fixed.

Three basic types of bearings have been previously described: (1) "solid" as depicted in FIGS. 29 and 30; (2) "semi-floating" as shown in FIGS. 27, 28 and 29; and (3) "floating" as represented in FIGS. 33 and 39. These appellations are defined as follows. "Solid" pertains to ball-, roller- and/or needle-bearings in which the shaft outer surface is restrained radially and no radial displacement of significance are allowed. "Semi-floating" pertains to the use of hydrodynamic pads (oil wedges) in which very little radial displacements are permissible and/or required. "Floating" as herein understood pertains to the use of air cushion support pads which inherently and practically require appreciable radial displacements to operate. The range of radial displacements are from nil to a small fraction of one thousandth of an inch for solid bearings, e.g. smaller than the shaft maximum tolerable bending deflections. Practical radial displacements in the 0.001-inch range are required for semi-floating bearings, e.g. of the order of the shaft deflection mentioned. Bearings of the floating type need practical radial clearances of 0.001 inch to a few thousandths of an inch, thus may allow radial displacements of 0.002 to 0.003 inch, e.g. larger than rigid shaft deflections or of the order of the deflections which may be acceptable for a flexible shaft and with complying shaft coupling.

It should be understood and remembered that the numbers quoted above represent only an indication of comparative radial displacements permitted by the bearings and shaft deflections as applicable to a middle size automotive engine, and a reference for the ensuing discussion. Three new definitions are also needed: (1) a rigid shaft is understood not to bend in the above context, (2) a flexible shaft is constructed so as to bend under normal operating loads to the extent that its maximum deflections are larger than the radial constraints that a semi-floating bearing can impose but smaller than those radial constraints imposable by a floating bearing, and (3) a complying shaft coupling allows a minimal amount of motion, radially and/or axially, between the motor and the system to be powered, the displacements thusly permitted being larger than the radial/axial constraint limitations imposed by floating-type bearings. It should also be understood and remembered that the components which impose radial loads on the shaft, namely the rotors, are not rigidly connected to the shaft (splines) and allow a certain amount of play, and develop loads of magnitudes much lower than those exerted on the crankshaft of a piston engine of equivalent power.

General statements may now be made regarding the overall design approach to the construction of conformable vane motors: (1) uses of solid bearings and of floating bearings may not be combined in one motor because the radial constraints that they impose are not compatible; (2) floating bearings could be exclusively used throughout, if a complying shaft coupling is also used; and (3) the combined use of solid bearings at both shaft ends and of intermediate semi-floating bearings appears possible, if use of a flexible shaft is also made.

If floating bearings are used, a thrust bearing must also be mounted at one point along the shaft length to resist any axial loads that may develop. It may consist of a circular flange positioned between two annular opposing air cushion pads of the type discussed earlier, but flat. A total axial displacement of the circular flange of a few thousandths of an inch will suffice to maintain the axial centering of the shaft. The complying coupling transmits only the motor shaft torque.

In the motor construction using solid bearings, the end bearings are supported by the end flanges and are of a well known conventional type which requires no further elaboration here. The intermediate bearings must be lubricated. Such a lubrication system is shown in FIGS. 29 and 30. Because the motor is not lubricated inside and oil must be prevented from leaking outside the metal foil seal and entering any of the spaces located between the various motor components, and because small oil leaks must always be viewed as potentially possible, a vacuum system sucks any oil that may at times leak past the coiled metal foil seal. The sucked oil is evacuated through a duct located inside the shaft. The same technique is used for hydrodynamic semi-floating bearings, to be next discussed.

If the shaft is made flexible enough by using certain metals such as titanium for instance, the end bearings may be of the solid type and the intermediate bearings may then be of the hydrodynamic type (oil wedges). The end bearings provide the shaft radial and axial supports to permit external rigid shaft coupling. The intermediate bearings, especially those located half-way between the two end bearings, provide mainly assistance for preventing the shaft/rotor/vane assembly from "whipping". The two end bearings can also be of the hydrodynamic type. In that instance, a thrust bearing must also be provided as earlier mentioned. The thrust bearing must resist axial loads in both directions. It may consist of a flat circular flange restrained by two opposing annular air cushion pads.

The stacking up of the stages, for air compression and combusted gas expansion, can be arranged in such a way that the resultant pressure forces that produce torque (or use it) in each stage and also rotate are not all oriented in almost the same direction but are fanned out over a 360° angle. This may create higher local bending moments on the shaft, of little significance anyway, but will eliminate the possibility of shaft whipping. This will particularly well apply to shafts mounted on floating air cushion bearings. Any possibility of resonant oscillating or vibrating conditions must be avoided. Such conditions are unlikely to be generated in the local bending modes of the shaft and/or the shaft torsional modes, in contrast with the situation existing in crankshafts of piston engines.

The possibility of loosely coupling short shaft sections, one for each rotor/vane assembly, to form a fully flexible and complying common shaft assembly has not yet been mentioned. It greatly simplifies the bearing assembling. Connecting bellows as shown in FIG. 36 can be used between shaft sections to duct high pressure air, oil, vacuum lines, etc . . . The connection between contiguous shaft sections is done by means of a male spline engaging its female spline counterpart located inside the shaft structure. Each shaft section has either two male splines, one at each section end or two female splines, one at each section end. The shaft portion located between the male splines and the rotor is fitted with a bearing for mounting inside its support flange. If single function stages are used, the rotor equipped with the combusted gas expansion vanes is mounted on a shaft section that has two male splines. The rotor equipped with the air compression function vanes is preferably installed on a shaft section having female splines. The combusted gas expansion provides the torque to drive the air compression rotor/vane assemblies and to supply extra power for external use. The two shaft sections which emerge from the end flanges are supported by two bearings: one end bearing and one intermediate bearing. The number of stages determines the optimum overall arrangement of shaft sections, splines and bearings. For example, the motor shown in FIG. 11 has four stages—two for compression and two for expansion—and could have four shaft sections, midle bearing 127 could then be omitted. It is obvious that this sectioned shaft arrangement is best suited for motor configurations which have an odd number of stages, thus an even number of bearings (or flanges). As discussed later, it is logical to provide one gas expansion stage in excess of the number of compression stages, thus yielding an odd number of stages for the whole motor.

In such an arrangement, all rotors still have a common shaft. But each shaft section and its rotor can then be solidly connected (one single part) and the splines 70 of FIG. 36 can be dispensed with along with ducting bellows 300. Some rotors then are equipped with two protruding shaft portions which consist each of the male spline at the end and of a cylindrical part for mounting the bearing. The other rotors have flat faces and house the female splines to be engaged by the male splines protruding from the contiguous rotors. The various stages of a motor can then be assembled separately, instead of being stacked up in a predetermined order, as is otherwise the case. Depending upon the type of vanes being used, the use of single vs dual function for the vanes, the total number of stages, the type of bearings and the engine application, a selection of the kind of shaft is possible. Suffices it to show here that a choice is available, that offers an additional construction option to the designer.

One last remark should be made regarding the use of floating bearings in connection with the use of dual function rotors. The motor construction shown in FIG. 13 is a good example of such dual function configuration. Rotor 55 is restrained between two diametrically opposed sealing zones. The resultant force of the pressure forces exerted on the rotor is directed downward and is the vectorial sum of the pressure forces applied by both the compressed air and the combusted gas at their highest levels. Such resultant force is obviously comparatively much larger than the resultant force which is exerted on the rotor in the case of a single function use such as that shown typically in FIG. 12, for similar pressure levels applied and rotor dimensions. Thus, either seal 59" and external structure contours 57 and 57' are shaped and constructed to absorb the resultant force loads or a floating-type bearing arrangement is unsuitable. The sealing effectiveness must also be considered in either case. Such an example typifies the design compromising which must be contemplated in the overall optimization of the motor configuration.

Motor Configuration and Construction Selection

It was made clear in the past discussion that many design alternatives and combinations thereof are optionally available. A discussion of the advantages and disadvantages of each and every option is beyond the scope of the present disclosure. Also the type of application intended for the engine affects such option selection process because the requirements, or lack of some, imposed by the engine application mode may emphasize or negate the advantages of certain features offered by a given engine design option. To limit the extent of the following discussion, a most universal application is used as an example: that of automobile propulsion yielding low pollutant levels whilst being capable of burning various types of low grade fuels.

Two further restrictions shall be imposed on the engine operation and on the manner in which the motor power is transmitted to the vehicle wheels: (1) no engine lubrication, and (2) no clutch and no gearbox, a continuously variable ratio automatic transmission being used. It is assumed that the external combustion member also operates without lubrication, air cushions being utilized between moving parts. It is also assumed that a flexible complying power shaft connects the motor to the automatic transmission, such shaft connection allowing relatively free radial and axial displacements of several thousandths of an inch. Both motor and transmission structures are rigidly connected so as to eliminate the possibility of any relative motion. The amount of play provided by the shaft compliance is thus greater than the amount of radial and axial displacements needed by floating bearings and/or a bidirectional air cushion axial thrust bearing. A rigid motor common shaft can be used, the assemblies of central body and vanes should rotate (rotors), single function vanes are preferable and air cushion bearings can be used throughout. Several choices and combinations thereof have been eliminated. A much simplified selection process still needs to be continued.

The choices left are: (1) rigid vs semi-rigid and/or flexible vanes, (2) the structure onto which the vanes can best be mounted, (3) the engine compression ratio, (4) the number of stages for either function–compression and expansion, (5) each stage vane number and/or the concommittant pressure ratio across each vane, (6) sealing or not sealing around the vane, etc. . . . For simplification sake, it will be assumed arbitrarily that a preferred embodiment of the motor is constructed according to the following four basic choices:

1. A total of six stages, three for air compression and three for combusted gas expansion, for an overall compression ratio of 10;
2. Air cushioned rigid vanes for the compression stages and flexible carbon/graphite vanes with fiber mat sealing;
3. Vanes mounted on the rotor and having end tip edges resting on the external structure track and equipped with air pads; and
4. Gas expansion volumetric ratio larger than air compression volumetric ratio to fully exploit a DAVID Cycle potential (see my U.S. Pat. No. 4,399,654).

This still leaves many minor choices open, such as: number of vanes for each stage, compression and/or expansion ratio of each stage, relative angular orientation of each stage and distribution thereof between stages, etc. . . . In the context of this disclosure, defining such choices is irrelevant and would add little to the reader's understanding. Other considerations come into play at this juncture and now need discussing.

Engine Operating Modes

Bearing in mind that low pollution and fuel burning ability are the two main potential advantageous features of the external combustion engine of the present invention, a discussion of the relationships between these two features and the motor construction are now in order. For the reasons earlier mentioned, the maximum temperatures of the combused gas entering heat exchanger 150 of FIG. 1 are closer to the peak temperatures reached in DIESEL engines than they are to those in OTTO Cycle engines. The combusted gas emerging from the heat exchanger and entering the first gas expansion chamber admission port reaches peak temperatures comparable to those reached by the gases impinging on the first row of blades of a gas turbine. Higher peak temperatures would necessitate higher peak temperatures in the combustion region and result in higher $NO_x$ production rates. Such temperatures could be handled by metal alloys if thermal expansion were not a potential problem. However, the use of high temperature metal alloys having a low or nil coefficient of thermal expansion is not practical here. For that reason, carbon/graphite and/or some ceramic composites and combinations thereof appear more promising. These temperature considerations apply particularly to the first stage of the combusted gas expansion, and possibly to the second stage, of the 6-stage motor previously discussed. In a multistage motor, each stage can be considered independently of the others.

A basic distinction between two variations of the DAVID Cycle, i.e. DAVID-I and DAVID-II is now worthy of further discussion. A DAVID-I Cycle corresponds somewhat to an OTTO Cycle in which the peak pressures reached by the combusted gas could be appreciably higher than the peak pressures of the associated compressed air. A DAVID-II Cycle corresponds to a DIESEL Cycle (or better BRAYTON Cycle) in which the combusted gas peak pressures can never exceed the maximum pressures to which the associated air was just compressed. Both cycles share the common trait of expanding the combusted gas to atmospheric pressure without the encumbrance of volumetric expansion limitation, as typically illustrated by a BRAYTON Cycle (gas turbine). Full advantage of a DAVID-I Cycle may be taken only if the fuel/air ratio is higher than that which would characterize a corresponding DAVID-II Cycle. This means higher temperatures of the combusted gas admitted into the first stage expansion chamber. The difference in gas peak temperatures between the two operation modes may be significant enough to dictate a choice of different materials for the first expansion stage. Carbon/graphite vanes can handle either cases. The material selection for seal 59, the external structure and/or the rotor, might however differ.

The trade-off is based on the gain in engine efficiency or fuel consumption compared to material and manufacturing cost increase. Other aspects should be considered such as the influence of peak temperatures on the heat exchanger construction and cost, the added complexity of a check valve being needed at the compressed air admission point in the combustion member if a valveless free-piston combustion member is used, so as to prevent the explosion gases at higher pressure from backing up into the ducts channelling the compressed air in. At the present time it is impossible to establish valid test grounds for a meaningful comparison. As the external combustion engine technology develops, and test data become available, the designer will be in a better position to reasonably assess such trade-off. The possibility of constructing motors for engines which can operate according to either DAVID Cycle has nevertheless been demonstrated.

Materials, Lubrication and Engine Life

In the free-piston combustion member shown schematically in FIG. 1, fuel is allowed to burn at a rate much slower than the corresponding rate which characterize conventional piston engines in a ratio as high as 10/1. It was also mentioned that lubrication of the moving parts of a free-piston combustion member is not required and that air cushions may be substituted therefor. If the motor needs no oil, the compressed air is clean except for dust particles present in the atmosphere. This air can be filtered. The introduction of foreign particles in the combusted gas can stem only from unburned solid fractions of the fuel. Because the combustion is so slow and takes place in a lean fuel/air mixture, it has a chance to be very complete, thereby reducing considerably that risk of solid particles being left unburnt in the combusted gas. The amount of solid particles introduced in the expansion member of the engine is thus much lower than is generally the case for Diesel engines.

The few solid particles present in the combusted gas which finds a way to escape around the vanes travel a very short distance between close surfaces. They can find their way through between the seal mat fiber stubbles and finally escape with the exhaust gases. However, it is important to insure that such particles do not cling to the stubbles. Preventing the presence of oil vapors and/or fuel volatile fractions in the combusted gas is thus essential. Fuel volatile fractions can be made to burn and oil vapors cannot be present unless oil is first introduced. With carbon/graphite vanes, few solid particles will always manage to get caught between the vane end edge and its track surface. Care must be taken that they do not become embedded in the vane material to form an abrading composite. A typical structure formed with thin foils of springy materials such as the densified carbon/graphite composites earlier mentioned can easily bend. The foils are free to slide to adjust to variations in foil length caused by the curvature changes that result from the flexible vane bending illustrated in FIG. 5. This relative foil sliding motion is minimal but it enables solid particles that might otherwise become trapped throughout the vane tip edge thickness to be pushed free by that motion between two contiguous foil edges. Also, when the vane tip edge either engages or disengages a step in the track surface, at the junction between seal and external structure for instance, the free edge of each foil can separate from the end edge of an adjacent foil, thereby shaking off solid particles which might have started inserting themselves between the foils. The combination of these two actions thus enables such vane tip edges to prevent particle trapping and to free themselves of abrading deposits which could damage and wear the track surface.

Except when vane tip air pads are used, the friction between vane end edges and that surface cannot be avoided. Wear of the track surface and of the vane must be minimized. The track material must therefore be hard and capable of providing a fine surface polish. It must also exhibit a nil or negligible coefficient of thermal expansion. Densified reinforced carbon/graphite composites are characterized by high temperature strength, low thermal expansion and self lubricating or anti-seizing qualities, but are not hard. However, the track surface may be hardened by seeding a layer of the external structure with a chemical element which combines with carbon to form a carbide form of such element. It is possible to select an element such as silicon that react with carbon to form silicon carbide under certain thermal conditions. Silicon carbide is a very hard heat resistant material which qualifies for in-depth coating of a carbonaceous sub-structure. This element is cited as one example amongst many other possibilities.

Another possibility is the use of ceramics, either as linings or for the bulk of the external structure. There are many types of ceramic materials: carbides, oxides, nitrides, borides, etc . . . The other chemical element may be: aluminum, zirconium, silicon, etc. . . . They all share drawbacks: brittleness, cost, novelty and lack of familiarity. Silicon carbide was mentioned previously because of the suitability of a reinforced carbonaceous structure. As an example, zirconia (zirconium oxide) is being investigated as a suitable ceramic candidate for Diesel engine applications. Brittleness seems inherent to ceramics. They appear unsuitable in applications where resistance to mechanical shocks is required. Special attention must be given to part shaping, fabricating and stressing modes while in operation. The operation of vane motors is certainly much smoother than that of piston engines, rather similar to that of gas turbines. Except for the vanes, all structural parts have simple and compact shapes. They do not appear to constitute ideal sources for generating vibrations and media for vibration transmission. Thus the use of ceramic materials as linings, inserts, simple structures and/or coatings should not be a problem for the vane motor construction just discussed.

The shaft, rotors and flanges are neither exposed to sizable amounts of friction nor excessive temperatures. Most conventional materials used in building piston engines will qualify for any specific use in a vane motor. Rigid vanes used for the compression function are not exposed to high temperatures and can be fabricated with conventional metal alloys. Semi-rigid vanes can be made of sheet metals. These might be suitable, when equipped with an air cushion pad, for use as expansion vanes in a DAVID-II Cycle engine, even as vanes of an expansion first stage.

Even with no lubrication, a vane motor can be constructed in a manner such that friction is practically eliminated. Wear under such operating conditions is nil or negligible. Care must be taken that: (1) air admitted in the compression chamber is clean, necessitating the use of an air filter; (2) fuel contains no impurities which may contribute to the production of solid particles upon or after combustion; and (3) moving parts inside the combustion member and/or the motor do not cause the formation of such particles. If such precautions are taken, the vane engine of the present invention constructed according to the disclosure description is operatable for a long period of time. It should be characterized by a lifetime of the order of that of Diesel engines, or possibly longer.

The motor construction is very simple. It can be disassembled easily. Parts can be easily and rapidly changed, if need be. For instance, a set of vanes can be replaced faster and in a less messy manner than would be the case for changing a broken ring in a piston engine. For that reason alone, the vane engines of the present invention represent an improvement when compared to a piston engine or equivalent power. This does not even taken into account the fact that it is also much less bulky.

Vane Engine General Operation and Potential

External combustion engines as referred to in this disclosure in a generic way generally consist of a motor portion and a combustion member portion. The motor portion commonly referred to as vane engine is the object of the present invention and combines the three basic functions of: (1) air compression, (2) combusted gas expansion, and (3) usable power extraction, as the difference between the energy produced by the gas expansion and that needed to compress the air. The operation of the motor portion is only indirectly coupled to that of the combustion member, both mechanically and operationally speaking. The indirect nature of such coupling is the distinctive and essential characteristic which gives the present invention external combustion (EC) engine its unique operational potential.

In summary, the most obvious advantage offered by this EC engine derives from its mechanical decoupling: i.e. the operational regimes of the motor and of the combustion process need not correspond temporally, neither synchronously nor in frequency. The motor regime is characterized by its rotational speed (rpm), the combustion member regime is characterized by its "pulsating" frequency as described in my U.S. Pat. Nos. 4,399,654 and 4,561,252. These two are related only by a fluid flow, air and/or gas. This constitutes a removal of the major constraint which has plagued piston engines, but which does not exist in gas turbines. The removal of this constraint means that combustion is then enabled to proceed at a much lower rate and for a much larger amount of fuel during each combustion pulse or cycle. Concomitantly, proper timing of the combustion pulse is no longer critical, initiation and ending, it is tied to the motion of a much slower-moving component.

Requirements imposed on the fuel regarding its ability to initiate burning and complete it are much less stringent. The implication is that lower grade fuels having a wider range of specified and essential characteristics can thus be burned in this type of engine. This also means that lower combustion temperatures and more complete burning henceforth result, yielding lower pollutant production rates for a given power level. It was earlier mentioned that lubrication could be disposed of altogether. Such possibility results chiefly from the fact that no large variations of the loads exerted on moving parts, either in magnitude or in direction, are ever generated. A short digression into the operation of the combustion member is now in order.

Let's refer now to FIG. 1 which schematically depicts an EC engine. The free piston 101 travels back and forth in sleeve 102 between two combustion chambers 110 and 111. Piston 101 motion causes compressed air and combusted gas to be admitted in (valving means 105) and exhausted out of (valving means 106) the combustion chambers automatically. The piston location and direction control the timings of fuel introduction and combustion initiation and duration by means not shown in FIG. 1. Free piston 101 is guided in its reciprocating motion by tube or hollow shaft G in a manner such that the piston structure never contacts either sleeve 102 or tube G. This requires very little effort because the piston is never subjected to large side loads. Piston 101 slides on air cushions located between tube G external surface and the inner surface of the piston internal bore. For that reason, no lubrication is required in the combustion member. In addition, no wear particles are produced either. It should be noted that the peak velocities reached by piston 101 are much smaller than the corresponding piston velocities accepted for piston engines. Thus a source of clean combusted gas produced by the combustion of a low grade fuel is available externally to the vane motor. If a DAVID-I Cycle engine is used, check valve V is needed, but is not when the engine is used to operate with a DAVID-II Cycle, as earlier mentioned and discussed.

An engine operation requiring no oil, without friction and hence exhibiting a very low rate of wear is most desirable. The penalty is a loss of energy or increased fuel consumption which results mainly from the energy needed for compressing some already compresed air to a higher pressure level. The energy utilized for this extra amount of air compression could represent between 5 and 10% of the engine energy production. Some of this energy is wasted in the form of pressure losses, but some is recovered in a monitored expansion that takes place with that of the combusted gas. The net result is possibly an energy loss of about 5% of the engine net energy production. The corresponding increase in fuel consumption needed to compensate for such energy loss is to be compared to the engine foreseeable advantages. These advantages are so diverse and of such range and depth that it is impossible and beyond the scope of this disclosure to attempt any realitic assessment of their potentialities. However, a list of direct advantages and of their indirect consequences thereof is given below for the reader's review and evaluation.

western economies on the brink of disaster nor represent an irreversible situation. The foolishness and shortsightedness which pervaded the U.S. automotive industry, executives, thinkers, designers and planners alike, will no doubt reappear as the price of a barrel of oil sinks. However, the rude awakening that is bound to happen if and when OPEC again succeeds in controlling prices of crude oil can only be more painful and far reaching than the last one.

Now is the time to rethink that combustion engine destined to be with us for a long time still. Internal combustion is inherently flawed with a generic defect, i.e. it must be fast and well timed, hence expensive and narrowly specified fuels must be used. Attempting to reduce pollution after the fact is inefficient, costly and irrational. Pollution must be reduced at the source by lowering combustion temperatures. That is politically unacceptable as it would deal a mortal blow to the gasoline engine. Unfortunately, the automobile industry developed and prospered around the use of gasoline, of which the U.S. could and learned how to produce plenty. This state of affairs created an addiction to a mode of transportation which has become a way of life. Cities were built with such a notion in mind. This has also become our master. Potentially, the external combustion engine is one way to break the spell and bring back rational thinking into energy resource management.

An engine efficiency loss of 5% is a small price to pay for such potential gains. Yet another consideration must be mentioned, that of an engine efficiency gain which results from a construction feature that is inherently part of the EC engine: the need of storage volume for compressed air and for hot combusted gas. It is only natural to locate these two volumes side by side so that heat can be exchanged between the two fluids. Such heat exchange occurs naturally in IC engines when the cool admission air enters the hot combustion chamber.

| ADVANTAGES AND CONSEQUENCES OF DAVID-CYCLE ENGINE USE | | |
|---|---|---|
| Direct Advantages | Short Range Results | Long Range Consequences |
| Use of lower grade fuels | Wider range of fuel sources & supplies | Less dependency on foreign sources & $-saving |
| Use of fuel having broad requirements | Lower production & refining costs | Lower cost of infrastructures (fuel storage, refining & transportation) |
| Lower pollutant production | Lower engine & operation costs | Lower health hazards & maintenance costs. Lower rate of deterioration of the environment. Saving of lives & in environment quality maintenance costs. |
| Smaller engine | Easier access & lower maintenance cost | Better utilization of technical manpower |
| Lower noise & vibration levels | Increased comfort & less driver's fatigue | Re-establishment of the US auto industry as a world leader of better & less expensive cars. Improved balance of foreign trade. |
| No lubrication | Lower operation cost Lower maintenance cost | Lower risk of car accidents - safer driving. |
| Safer engine operation (stall) | Lower risk of accidents | Lower insurance rates |

The list above is neither limitative nor complete. It pertains only to one single application, best known and understood by the general public. Other applications to boats, aircrafts, buses, trucks, trains, powered equipment, etc . . . could be examined in a similar manner. However, automobile propulsion constitutes the bulk of the consumer of fuels obtained from crude oil. Therefore it represents the greatest source of air pollution in most urban centers. Also this type of fuel consumption is best understood and appreciated by consumers, as each trip to the filling station constantly reminds every one of us. The discomfiture and setbacks that OPEC is now experiencing (Spring of 1986) should neither be construed as a permanent cure to the ills which brought This does not happen in EC engine vane motors, especially when the air compression and gas expansion functions are performed in different stages. It should also be noted that heating air before compression instead of heating it after compression is an energy-wasting process as is well known by thermodynamicists. The design flexibility offered by an EC engine construction enables the engine designer to take full advantage of such heat exchanging possibilities that are not present in IC engine constructions. Two potential engine efficiency gains can now be exploited.

As is the case in gas turbines, contrary to that of OTTO-Cycle engines, the thermodynamic efficiency of a DAVID-Cycle engine is predicted on operating the combusted gas expansion at the highest possible gas inlet temperature, for a given compression ratio. This limitation depends on the highest operating temperature that the vane material can withstand indefinitely. Such limitations do not apply to carbon/graphite vanes, but would to vanes made of metal alloys. Generally then, the combusted gas contain an excess of air. This air excess may be reduced by increasing the limits applied to combustion gas peak temperatures. The amount of cooling of the hot combusted gas provided by the heat exchanger, for a given fixed inlet temperature limit, corresponds to an increase in the peak combustion temperature permissible in the combustion chambers, and a concurrent decrease in excess air amount. The amount of hot combusted gas cooling of course corresponds to the amount of pre-heating transferred to the compressed air. For a given peak combustion temperature, this means less fuel needed. These are the two potential gains in engine thermodynamic efficiency mentioned above: (1) lower fuel consumption per unit of air mass, and (2) smaller air amounts needed per unit of energy produced. These two effects actually combine to yield a net overall efficiency gain which is not very different from the sum of the two previous items, percentage-wise.

Detail calculations indicate that this overall efficiency increase could also reach a 10% level, or higher. Such gain is at least equal to or generally higher than the energy loss caused by the high pressure air use. As a rule of thumb, for the purpose of this discussion, it is assumed that neither loss nor gain result from the combination of these two processes. The only other major factors affecting engine efficiency are: (1) mechanical losses, (2) engine cooling losses, and (3) back pressure losses. The last factor was earlier discussed when various thermodynamic cycles were described and compared to the DAVID cycles. No additional remark is needed except to note that the EC engine of the present invention provides the advantages of a turbo-charger at neither extra cost nor added complications.

The first and the second factors are related in the sense that no friction creates no heat and no lubrication means no heat being removed. A corollary aspect is that the absence of oil permits higher operating temperatures of surfaces in contact or proximity with moving parts, whilst requiring no cooling. The implications are that the mechanical losses are much lower than those of a corresponding power IC engine and the engine cooling losses are practically nil. External thermal insulation of some engine components will only be required, but this is not a heat loss and contributes instead to reducing such losses. It is again impossible to ascertain a value for the engine efficiency gain which results from the substantial reduction in such losses. Based on values assigned to those in the case of IC engines, it can safely be stated that an overall efficiency gain of 5 to 10% could result. In conclusion, a comparison based on equal compression ratio between OTTO-Cycle IC engines and DAVID-Cycle EC engines can show an overall engine efficiency improvement of 10 to 20%. A comparison with DIESEL-Cycle IC is less straightforward because a vane motor may not practically yield equivalent compression ratios. In that case, it may be safe to say that DAVID-Cycle EC engines could be as efficient as DIESEL-Cycle IC engines. This compares very favorably with the top efficiencies that can ever be reached with gas turbines. A comparison with gas turbines is in order because DAVID-Cycle EC engines equipped with a vane motor present many similarities with gas turbines and can replace them in applications where gas turbines have replaced steam turbines and/or Diesel engines. Also, the operation mode of such EC engines bears more functional similarity with that of gas turbines than it does with that of IC engines.

CONCLUSIONS

Although no test results are available to fully back up the advantages enumerated in the above discussion, readers familiar with the design and development of combustion engines are given therein enough information to enable them to analyze the content of this disclosure and verify these statements. A friction-less free-piston combustion member is described and discussed in another Patent Application concurrently filed. The combination of the contents of these two disclosures represents the results of the evolution process taking place in the concept of EC engines which started with my U.S. Pat. No. 4,399,654 and continued with my other U.S. Pat. No. 4,561,252.

It can be concluded that the use of new materials such as ceramics and reinforced carbon/graphite composites will find more useful and beneficial applications in EC engines then they will in IC engines and concurrently that the inherent advantages of EC engines will be more significantly affected. During the next few decades, significant technological advances in the field of car propulsion must come forward. Most of those must be related to fuels in a manner such that fuel sources do not become depleted and/or can be utilized as a coercive element in global geopolitics. The other most critical aspect of automobile fuels and use thereof is the by-product left behind: pollution.

The EC engine construction embodying a free piston combustion member is the key element which removes the constraints imposed on IC engine fuels, especially gasoline engines. The other key element is the removal of the side loads exerted by the pistons of IC engines. This enables the introduction of novel and less wasteful means of converting combusted gas internal energy into shaft power without having to transform the linear kinetic energy of massive parts into rotational kinetic energy, thus eliminating a major source of shocks and vibrations. The reciprocating motion of the free piston will generate low frequency vibrations but of low intensity. The vane motor will generate vibrations of much higher frequency but with very minimal amplitudes. The linear motion of the free piston can be guided along an axis oriented with respect to the vehicle so as to minimize its effect on the vehicle frame. The possibility of mechanically decoupling the motor and the combustion member offers a flexibility of engine mounting configurations onto the vehicle never yet foreseen. The optimization of such engine overall configuration is not discussed here but will no doubt reveal other additional advantages of the EC engine. An internal optimization of the engine construction is only alluded to. The importance of and penalty in using high pressure air to eliminate lubrication have been discussed and weighed but not optimally balanced, such optimization being beyond the scope of the present disclosure. The air pressurizing system required is depicted schematically in FIG. 1, where the air ducting thereof is shown in dotted lines.

Compressed air is ducted from the air pipe connecting the heat-exchanger/storage-tank and the combustion member to a compressor C driven by shaft S. Air filter F insures that the high pressure air flow controlled by pressure regulator P is clean. Some of the high pressure air is supplied to the combustion member for the air cushion pads supporting the piston, the rest of the compressor flow is delivered to the vane motor for supplying the various air cushions located therein. The ratio of these two air flows is determined by the relative dimensioning of the air cushions in the piston and in the motor. Only detail engine analysis and design can determine an optimum value for that ratio. A cursory analysis reveals that the major part of the high pressure air is expended in the motor, where friction could occur between parts moving at much higher velocity and where the sum total of the areas offered to the air for escape is larger than the sum total of the areas having a similar function and located inside the free piston.

The substitution of a vane swinging motion for a vane sliding motion greatly reduces the amount of friction created by the vane movement and also provides an improved guidance of the vanes throughout their travels. This facilitates and improves the sealing around the vanes. The degree of freedom of the vanes is reduced, which should help minimize the amount of vane vibrations. Flexible and semi-flexible vanes may not even vibrate at all.

The development and the construction optimization of a vane motor appear to present no major unknown element as they do not require the introduction and/or application of new untested materials or techniques. The elimination of the need for lubrication seems to represent a key factor in such assessment. For that reason, the technique of air cushions and its applications to various parts of the vane motor are extensively covered.

Summarily, the EC engines using DAVID Cycles represent certainly one promising approach. Others will undoutedly come along. However, it is thought that the EC engine motor vane of the present invention and many of its attendant advantages will be understood from the foregoing description and discusion, and it will be apparent that various changes may be made in the form, construction and arrangement of the parts thereof without departing from the spirit and scope of the invention or sacrificing all or any of its material advantages, the forms hereinbefore described and discussed being merely preferred or examplary embodiments thereof.

Having thus described my invention, I now claim:
1. An external combustion vane engine, comprising:
  means for compressing air and expanding combusted gas;
  a shaft connecting the compressing and expanding means for delivering power by means of an external drive shaft;
  means for receiving compressed air from the compressing and expanding means, mixing a fuel with the compressed air, igniting the mixture to produce combusted gas, and delivering the combusted gas to the compressing and expanding means,
  the compressing and expanding means including a plurality of generally cylindrical center bodies, a plurality of generally cylindrical fixed hollow external structures surrounding and enclosing the center bodies, flange means for support of the center bodies by the fixed hollow external structures for relative rotation therebetween about the shaft axis, each one set of center body and associated hollow external structure being positioned between two adjacent flanges, the external hollow structures and the center bodies having continuously curved surfaces positioned to face each other, a plurality of vane means extending between each one of two adjacent flanges at a plurality of circumferentially spaced locations from an outer facing surface of the center body to an associated inner facing surface of the external hollow structure to thereby define a plurality of substantially circumferentially spaced sealed spaces between the flanges and the two associated circumferential facing surfaces, each one of the vane means comprising a rigid curved vane structure having four sides and two generally parallel curved faces, two opposite sides being enabled to slide on associated flat surfaces of the flange means, one first side of the other two opposite sides being enabled to slide on the inner facing surface of the associated external hollow structure and the second side of the other two opposite sides being articulated by means of a cylindrical axle mounted in an associated lodging located on the outer surface of the associated center body, the radii of curvature of the vane curved faces being equal to the corresponding to radii defining the center body outer surface, the vane first sliding side being constantly urged to follow the external hollow structure inner surface thus making the vane means conformable to the shapes imposed on the sealed spaces, the curvatures and relative positions of the facing circumferential surfaces being such that some of the sealed spaces progressively decrease in volume whilst the balance of said sealed spaces progressively increase in volume as relative rotation of the facing surfaces takes place, an air inlet at the location where the decreasing volume is largest, an air outlet at the location where the decreasing volume is smallest, a combusted gas inlet at the location where the increasing volume is smallest and a combusted gas outlet at the location where the increasing volume is largest;
spline means for slideably mounting the center bodies on the connecting shaft and drive shaft assembly;
means for supplying air at high pressure to a plurality of air cushion bearings located between associated sliding surfaces;
means for applying the air pressure in a preferential direction on the two bearing surfaces in a manner such that any decrease in the distance separating the bearing two surfaces causes an increase of the air pressure, thereby generating a restoring force that constantly and continuously opposes said distance decrease and maintains the two bearing surfaces at a preset separation distance in cooperation with an opposing bearing air cushion;
means for generating a self-regulating response of the air pressure variations to separation distance variations;
means for forming said air cushion bearings between the shaft and the associated supporting flange means;
means for forming said air cushion bearings between each one of the two sides of each central body and the corresponding surface of the associated flange means;

means for forming said air cushion bearings between each one of the two sliding sides of the vanes and their associated flange means surfaces;

means for forming said air cushion bearings between the surfaces of each vane cylindrical axle and its associated lodging;

means for ducting high pressure air to the air cushion bearings formed between said axle and lodging;

a rest pad mounted on each one of the second one of the vane opposing sides which follows the hollow external structure inner surface and articulated so as to constantly face said inner surface, said rest pad including a hinge articulation extending substantially the length of said vane side for enabling the pad to oscillate freely about said articulation for conformance with the shape of said inner surface, means for forming an air cushion bearing in cooperation with said inner surface, means for supplying said air cushion bearing with high pressure air, means for closing the ends of the air cushion bearing with face the cooperating surfaces of the flange means, means for causing the pressure existing in the air cushion bearing to vary in the inverse ratio of the distance separating the pad from said inner surface, whereby (1) the outwardly directed forces exerted on the vane second side are balanced by the forces developed by the pressure existing inside the pad air cushion bearing, (2) solid friction between said vane side and said inner surface is substantially prevented, and (3) friction is limited to that of the hinge articulation.

2. An external combustion engine according to claim 1 wherein each one of the two closed ends of the pad forms an air cushion in cooperation with the surface of its associated flange, and further comprising:

means for supplying air at high pressure to said air cushion from the pad internal volume; and means for causing the pressure inside the air cushion to vary in the inverse ratio of distance between the pad closed end edges and the flange surface, such said air pressure variations being similarly generated inside the air cushion located at the other end of the pad but acting in an opposite direction so that two opposite forces are thus exerted on the pad in the direction of its hinge articulation;

whereby the pad is thus continuously and constantly forced to center itself between the two flanges, as the vane first side slides on the hollow external structure inner surface.

3. An external combustion engine according to claim 1 wherein the high pressure air needed for the operation of the vane side air cushions, of the rest pad air cushion and of the pad end air cushions is channelled through the vane articulation in the center body in a manner such that the minimum air pressure existing inside either one of the air cushions remains always higher than the peak pressures reached by the compressed air and the combusted gas at any internal locations in the vane engine, and further comprising:

means for filtering the high pressure air so as to eliminate the introduction of foreign matters inside the air cushions;

whereby the air cushions remain internally clean and the means for causing the air pressure variations therein are prevented from becoming clogged.

4. An external combustion engine according to claim 1 wherein the high pressure air is compressed air further compressed to a much higher pressure by a compressor driven by the engine, said high pressure air thus representing a partial bleed-off air flow from the engine compression air flow delivery, being used for mechanically isolating engine parts which have large relative velocities and which may otherwise make solid contact resulting in undesirable friction causing deleterious heat and wear being generated inside the engine during its operation.

5. In combination:

an external combustion engine with conformable vanes and comprising a motor member including means for comprising air and expanding combusted gas resulting from the combustion of a fuel in the compressed air, a combustion member for receiving compressed air from the motor member, mixing the fuel with the compressed air, igniting the mixture and burning the fuel, and delivering the combusted gas to said motor member, and a shaft connecting the compressing and expanding means for delivering power by means of an external drive shaft, the motor member further including a plurality of generally cylindrical center bodies, a plurality of generally cylindrical hollow external structures surrounding and enclosing corresponding ones of the center bodies, a plurality of flanges supporting the center bodies and hollow external structures for relative rotation therebetween about the shaft axis, each center body and corresponding hollow external structure being positioned between a corresponding pair of adjacent flanges, the external hollow structures and the center bodies having continuously curved surfaces positioned to face each other, a plurality of vane means extending between each one of two adjacent flanges at a plurality of circumferentially spaced locations from an outer facing surface of the center body to an associated inner surface of the hollow external structure to thereby define a plurality of substantially circumferentially spaced sealed spaces between the flanges and the two associated circumferential facing surfaces, each one of the vane means comprising a rigid curved vane structure having four sides and two generally parallel curved faces, two opposite sides being enabled to slide on associated flat surfaces of the flanges, one first side of the other two opposite sides being enabled to slide along said inner facing surface and the second side of the other two opposite sides being articulated by means of a cylindrical axle mounted in an associated lodging located on the outer surface of the associated center body, the radii of curvature of the vane curved faces being equal to the corresponding radii defining the center body outer surface, the vane first sliding side being constantly urged to follow the inner surface of the hollow external structure, thus rendering the vane means conformable to the shapes imposed on the sealed spaces, the curvatures and relative positions of the facing circumferential surfaces being such that some of the sealed spaces progressively decrease in volume whilst the balance of said sealed spaces progressively increase in volume as relative rotation of the facing surfaces takes place, an air inlet at the location where the decreasing volume is largest, an air outlet at the location where the decreasing volume is smallest, a combusted gas inlet at the location where the increasing volume is smallest and a combusted gas outlet at the location where the increasing volume is largest; and a plurality of air cushion bearings located between all sliding surfaces formed by the relative motions of the center bodies, the external structures, the vanes and the shaft, each air cushion being formed in a shallow cavity positioned between two closely located contiguous sliding surfaces, said cavity being defined by a first sliding surface on one side and a generally matchinglyshaped second surface on the other side, the first and second surfaces being generally parallel, the second surface being surrounded by a third narrow surface substantially orthogonal to the second and first surfaces and extending around the perimeter of the second surface and rising to a fourth surface generally parallel to the first surface and forming the other associated cooperating sliding surface, the supporting means so provided by said plurality of air cushion bearings further including:

means for supplying and ducting pressurized air to each of said shallow cavities, a fixed size restricting orifice positioned in the ducting means between the air supplying means and each shallow cavity, means for enabling the pressurized air to leave each air cushion bearing between its corresponding two sliding surfaces for venting into the corresponding sealed spaces, and means for enabling two cooperating air cushion bearings to operate in opposition against two of the first surfaces, said surfaces being fixed and separated by a fixed distance, the air cushion bearings being housed in a structural member so as to be guided by and restrained between said two first surfaces in its sliding motion, said structure extending between two of the fourth surfaces separated by a distance slightly smaller than the distance separating the first two surfaces, so as to form two gap openings, each one gap being positioned between associated cooperating first and fourth sliding surfaces, one gap opening becoming automatically larger when the other gap opening becomes smaller and vice-versa, whereby each gap opening created by the distance separating each pair of cooperating sliding surface along a perimeter of the corresponding cavity forms a variable area restricting orifice, thereby enabling the pressure inside the cavity to vary according to said distance between the two sliding surfaces, and whereby a guided and restrained structural member equipped with said air cushion bearings becomes automatically centered and is maintained in said centered position between the two guiding and restraining first surfaces without solid contact being made.

6. The combination of claim 5 wherein the means for supplying pressurized air further includes:

means for further compressing the air already compressed by the motor member compressing means;

means for filtering said already compressed air; and means for drivingly connecting the motor member drive shaft to the means for further compressing the air.

7. The combination of claim 5 wherein the center bodies are mounted on the shaft by means of splines so as to enable said center bodies to slide freely along the shaft axis between two adjacent flanges, each one of said center bodies further including a pair of air cushion bearings, one of each such pair being located between one of the two flat sides of the center body and a cooperating flat surface of the guiding and restraining flange, said air cushion bearing further including:

ducting means located in the center body for supplying pressurized air to the air cushion cavities; and means for providing a narrow separation distance between the corresponding cooperating flat surfaces of the flange and of the associated center body.

8. The combination of claim 5 wherein air cushion bearings are provided between the sliding opposite side faces of each vane and the guiding flange cooperating surfaces for preventing the vanes from making solid contact with said flanges during the sliding movement of the vane means.

9. The combination of claim 5 wherein air cushion bearings are provided between the shaft and its flange-mounted supporting means for maintaining said shaft centered in said supporting means so as to prevent solid contacts from being made between the flanges and the shaft during the shaft rotation.

10. The combination of claim 5 wherein the vane articulation on the center body outer surfaces includes:

means for urging the vane cylindrical axle to constantly rest on and be restrained by the walls of its lodging in the center body so that the vane articulation axis continuously remains in a fixed position with respect to its lodging axis;

means for channelling pressurized air from the center body to air ducts located inside the vane structure; and means for forming an air cushion cavity between said lodging walls and the axle outer surfce so as to eliminate risks of seizing and galling of the two surfaces in contact.

11. The combination of claim 5 wherein the first side of each vane sliding on the external hollow structure inner surface is provided with an articulated pad extending substantially the distance separating two adjacent flanges, said pad comprising:

an air cushion cavity substantially extending the pad length;

two air cushion bearings located at each end of the pad;

hinge means for enabling the pad to tilt so as to insure the air cushion formation in cooperation with the inner facing surface for all positions of the vane and degrees of curvature of the inner surface;

means for channelling pressurized air from the vane structure to the pad air cushion and the end air cushion bearings; and air cushion means located in the pad hinge for preventing seizing and galling of the hinge cooperating surfaces;

whereby the force generated by the air pressure inside the air cushion cavity opposes and balances the centrifugal force applied on the vane structure, while also preventing solid contact from being made between the vane and the external structure inner surface.

12. The combination of claim 11 wherein recessed cavities are provided (1) in the center body structure on its outer surface for lodging the vane structures and (2) in the vane structure for lodging the pad structure when the external structure inner surface and the center body outer surface are in contact, said combination further including:

means provided on the center body, the vane concave surface and the external structure inner surface for cooperating in forming a quasi continuous cylindrical surface of revolution when a vane is folded; and means provided on the external structure inner surface for preventing mechanical interferences between the pad structure and ports located on the inner surface of the external structure for air inlet, air outlet, combusted gas inlet and combusted gas outlet purposes.

13. The combination of claim 5 wherein pressurized air is introduced on the center body outer surface between each vane and said surface when the vane is folded thereupon so as to prevent vanes from adhering to said surface, and further including:

means for ducting said air from a supply source; and a restricting orifice located between said source and the location where the air is introduced on the outer surface, thereby limiting the amount of air loss when the vane is unfolded.

14. The combination of claim 5 wherein all vane means located between a first center body and the corresponding hollow external structure are used for air compression, whereas all vanes located between a second center body and the corresponding hollow external structure are used for combusted gas expansion.

15. The combination of claim 5 wherein half of the vane means located between a center body and a corresponding hollow external structure are used for air compression, whereas the other half of the vane means are used for combusted gas expansion.

* * * * *